(12) United States Patent
Choi et al.

(10) Patent No.: US 12,526,168 B2
(45) Date of Patent: Jan. 13, 2026

(54) CONTROL DEVICE FOR A BUILDING AUTOMATION SYSTEM HAVING GLOBAL DATA MANAGEMENT

(71) Applicant: Siemens Industry, Inc., Alpharetta, GA (US)

(72) Inventors: William Choi, Lake Zurich, IL (US); Thomas Evans, Chicago, IL (US); Robert L. Johnson, Lincolnshire, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 416 days.

(21) Appl. No.: 17/853,550

(22) Filed: Jun. 29, 2022

(65) Prior Publication Data

US 2023/0231735 A1    Jul. 20, 2023

Related U.S. Application Data

(60) Provisional application No. 63/299,691, filed on Jan. 14, 2022.

(51) Int. Cl.
*H04L 12/28*   (2006.01)
*G05B 15/02*   (2006.01)

(52) U.S. Cl.
CPC ............ *H04L 12/283* (2013.01); *G05B 15/02* (2013.01); *G05B 2219/2642* (2013.01)

(58) Field of Classification Search
CPC ..................................................... H04L 12/283
See application file for complete search history.

(56) References Cited

U.S. PATENT DOCUMENTS

| | | | |
|---|---|---|---|
| 7,353,070 B2 | 4/2008 | Landou et al. | |
| 2014/0207707 A1* | 7/2014 | Na | G08C 17/02 |
| | | | 709/208 |
| 2015/0351145 A1* | 12/2015 | Burks | H04L 63/102 |
| | | | 455/41.3 |
| 2017/0099157 A1* | 4/2017 | Jacobson | H04L 12/2814 |
| 2017/0212487 A1* | 7/2017 | Gupta | F24F 11/62 |
| 2018/0115435 A1 | 4/2018 | George et al. | |
| 2020/0012249 A1 | 1/2020 | Altendorf et al. | |

FOREIGN PATENT DOCUMENTS

WO    2020153966 A1    7/2020

* cited by examiner

*Primary Examiner* — Nathan L Laughlin

(57) ABSTRACT

A controller of a building automation system, and a method thereof, comprising a communication component and a processor. The communication component communicates with one or more other controllers of multiple automation level devices. The automation level devices are associated with an automation level network of the building automation system. The automation level devices include the controller and the other controller(s). The processor designates a particular controller of the automation level devices as a global data server. The global data server provides synchronized images of a predefined set of objects across all controllers of the automation level network.

10 Claims, 17 Drawing Sheets

CONTROL DEVICE FOR A BUILDING AUTOMATION SYSTEM HAVING GLOBAL DATA MANAGEMENT

RELATED APPLICATION

This patent document claims priority under 35 U.S.C. § 119 and all other benefits from U.S. Provisional Application No. 63/299,691, titled "Control Device for a Building Automation System", filed Jan. 14, 2022, the content of which is hereby incorporated by reference to the extent permitted by law.

FIELD OF THE INVENTION

This application relates to the field of control devices for building automation systems and, more particularly, to automation controllers of a building automation system for coordinated operation of field devices.

BACKGROUND

Building control systems are employed to regulate and control various environmental and safety aspects of commercial, industrial and residential facilities (hereinafter referred to as "buildings"). In ordinary single-family residences, control systems tend to be simple and largely unintegrated. However, in large buildings, building control systems often consist of multiple, integrated subsystems employing hundreds of elements.

For example, a heating, ventilation and air-conditioning ("HVAC") building control system interrelates small, local control loops with larger control loops to coordinate the delivery of heat, vented air, and chilled air to various locations throughout a large building. Local control systems, for example, open and close vents that supply heated or chilled air based on local room temperature readings. Larger control loops, for example, obtain many distributed temperature readings and/or air flow readings to control the speed of a ventilation fan, or control the operation of heating or chilling equipment.

As a consequence of the interrelationship of these control loops, many elements of a building control system must communicate information to each other. To this end, communication networks have been incorporated that transmit digital data between and among the various elements in accordance with one or more sets of protocols.

Some of the core elements of a sophisticated building control systems include panel devices, supervisory control stations, sensors and actuators. Sensors and actuators are terminal devices of the system that collect raw data and physically change output of the system, respectively. For example, sensors may include temperature sensors, humidity sensors, air flow sensors and the like. Actuators may change the physical output of fans, ventilation dampers, air conditioning equipment and the like. Panel devices are distributed control devices that in large part determine the operation of the system, at least at local levels. To this end, panel devices may receive sensor signals from the sensors and provide control signals to the actuator. The panel devices generate such control signals based on the sensor signals and other control signals, such as set point signals received from other panel devices and/or the control station. The control station is typically a computer having a human user interface that allows for human technicians to monitor and control overall system operation.

In such systems, the panel devices are generally connected to each other as well as to the one or more control systems in order to share information necessary for coherent building control.

SUMMARY

In accordance with one embodiment of the disclosure, there is provided an enhanced approach for automation controllers of building management systems. The enhanced approach provides secure communication connections among building automation devices for security and integrity of information, networks, and infrastructure. The advanced approach also provides an advanced web interface for commissioning, editing, and servicing the automation controllers. For example, one or more automation controllers may include enhanced firmware, hardware to support the firmware, a secure communication protocol (such as BACnet Secure Connect), and an embedded web interface.

One aspect is a controller of a building automation system comprising a communication component and a processor. The communication component is configured to communicate with one or more other controllers of multiple automation level devices. The automation level devices are associated with an automation level network of the building automation system. The automation level devices include the controller and the other controller(s). The processor is configured to designate a particular controller of the automation level devices as a global data server. The global data server provides synchronized images of a predefined set of objects across all controllers of the automation level network.

Another aspect is a method of the controller of the building automation system. The method comprises communicating, via a communication component of the controller, with one or more other controllers of automation level devices. The method also comprises associating, via the communication component, the automation level devices with an automation level network of the building automation system, in which the automation level devices includes the controller and the other controller or controllers. The method further comprises designating, via a processor of the controller, a particular controller of the automation level devices as a global data server. The method still further comprises providing, via the processor, synchronized images of a predefined set of objects across all controllers of the automation level network.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
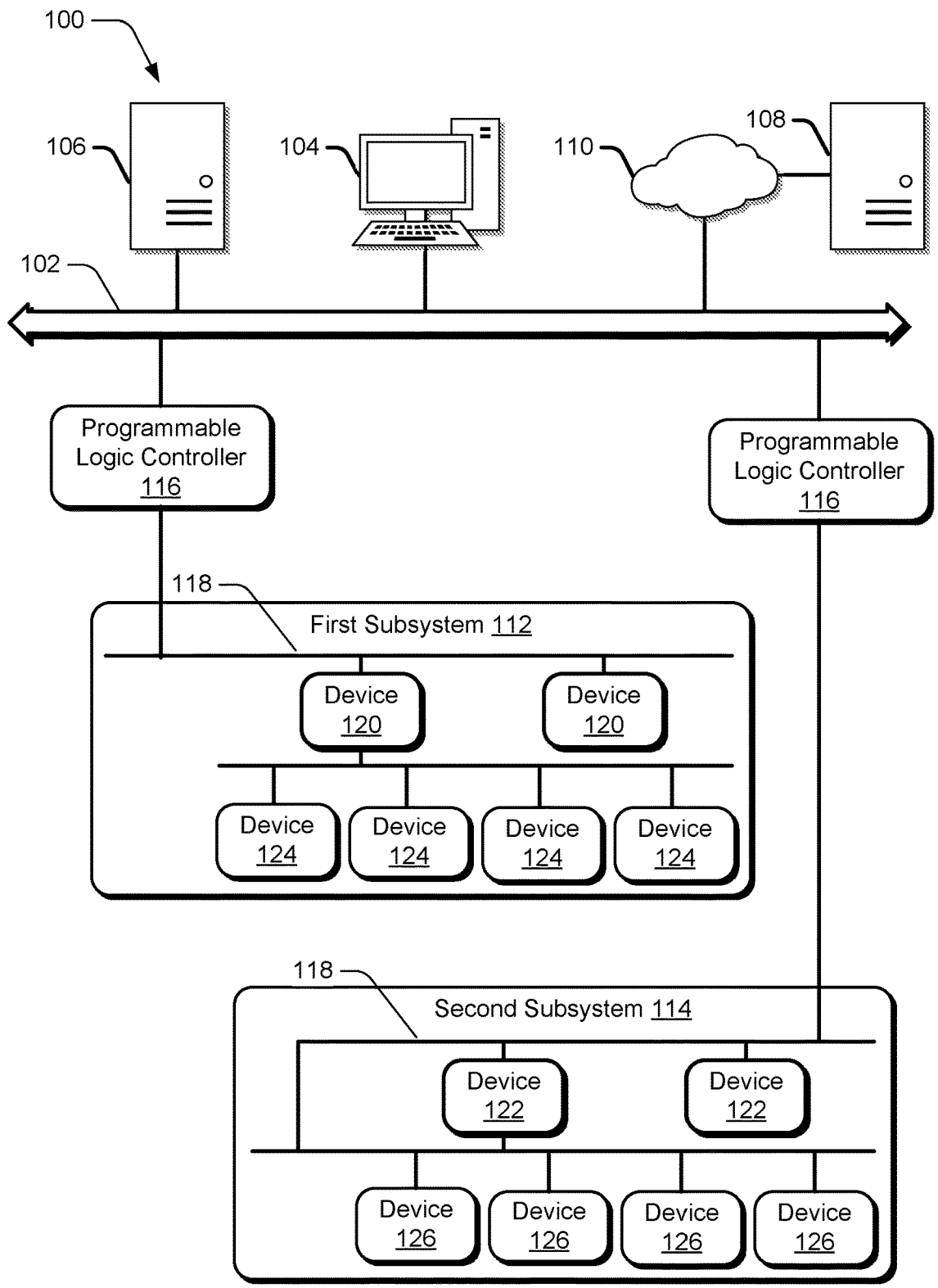
FIG. 1 is a schematic view of a building automation system in an example implementation that is operable to employ techniques described herein.

Various technologies that pertain to systems and methods that facilitate installation, commissioning, operation, and maintenance of an automation controller of a building management system will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Referring to FIG. 1, there is shown a building automation system ("BAS") 100 in an example implementation that is operable to employ techniques described herein. The BAS 100 includes an environmental control system configured to control one or more environmental parameters for a facility, such as fluid flow, fluid pressure, fluid temperature, and the like. For example, the BAS 100 may comprise one or more network connections or primary buses 102 for connectivity to components of a management level network ("MLN") of the system. For one embodiment, the example BAS 100 may comprise one or more management level devices or management devices, such as a management workstation 104, a management server 106, or a remote management device 108 connecting through a wired or wireless network 110, that allows the setting and/or changing of various controls of the system. A management device may also be a portable management device connecting through a wired or wireless link to an individual automation or field level device 120-126 that allows the setting and/or changing of various controls of the device. While a brief description of the BAS 100 is provided below, it will be understood that the BAS 100 described herein is only one example of a particular form or configuration for a BAS. The system 100 may be implemented in any other suitable manner without departing from the scope of this disclosure. The management devices are configured to provide overall control and monitoring of automation devices, a field devices, and other devices of the BAS 100.

For the illustrated embodiment of FIG. 1, the BAS 100 provides connectivity based on one or more communication protocols to subsystems for various environmental parameters, such as components of environmental comfort systems. Each subsystem 112, 114 may include various automation level devices 120, 122 ("automation controllers") for monitoring and controller field devices as well as various field level devices 124, 126 for monitoring and controlling areas within a building or group of buildings. For field devices 124, 126 that monitor and control fluid heating-cooling HVAC equipment, the field devices may include, but are not limited to, actuators, sensors, and other types of controllers for the HVAC equipment, such as fluid heating/cooling generators, pumps, compressors, condensers, evaporators, tanks/reservoirs, filters, dampers, valves, bypass mechanisms, and the like.

For some embodiments, the BAS 100 may include one or more programmable logic controllers 116 for connectivity to components of a building level network (BLN) of the system 100. Each programmable logic controller 116 may connect the primary bus 102 of the MLN to a secondary bus 118 of the BLN. Each programmable logic controller 116 may also include management logic for switching, power quality, and distribution control for the BLN components. For example, automation level devices 120, 122 may communicate directly with the network connection or secondary bus 118 of the BLN, whereas field level devices 124, 126 may communicate through, and controlled by, the automation level devices.

In these illustrative embodiments, each object is a representation of a building automation component that includes property information about its function and purpose. Objects associated with the BAS 100 include data created, processed, and stored by the automation level devices 120, 122 and the field level devices 124, 126, such as temperature data, pressure data, and air/fluid flow, as well as analytical data, such as control schedules, trend reports, defined system hierarchies, and the like. The illustration of the BAS 100 in FIG. 1 is not meant to imply physical or architectural limitations to the manner in which different illustrative embodiments may be implemented. Other components in addition to and/or in place of the ones illustrated may be used, and some components may be unnecessary in some illustrative embodiments.

Figure 2:
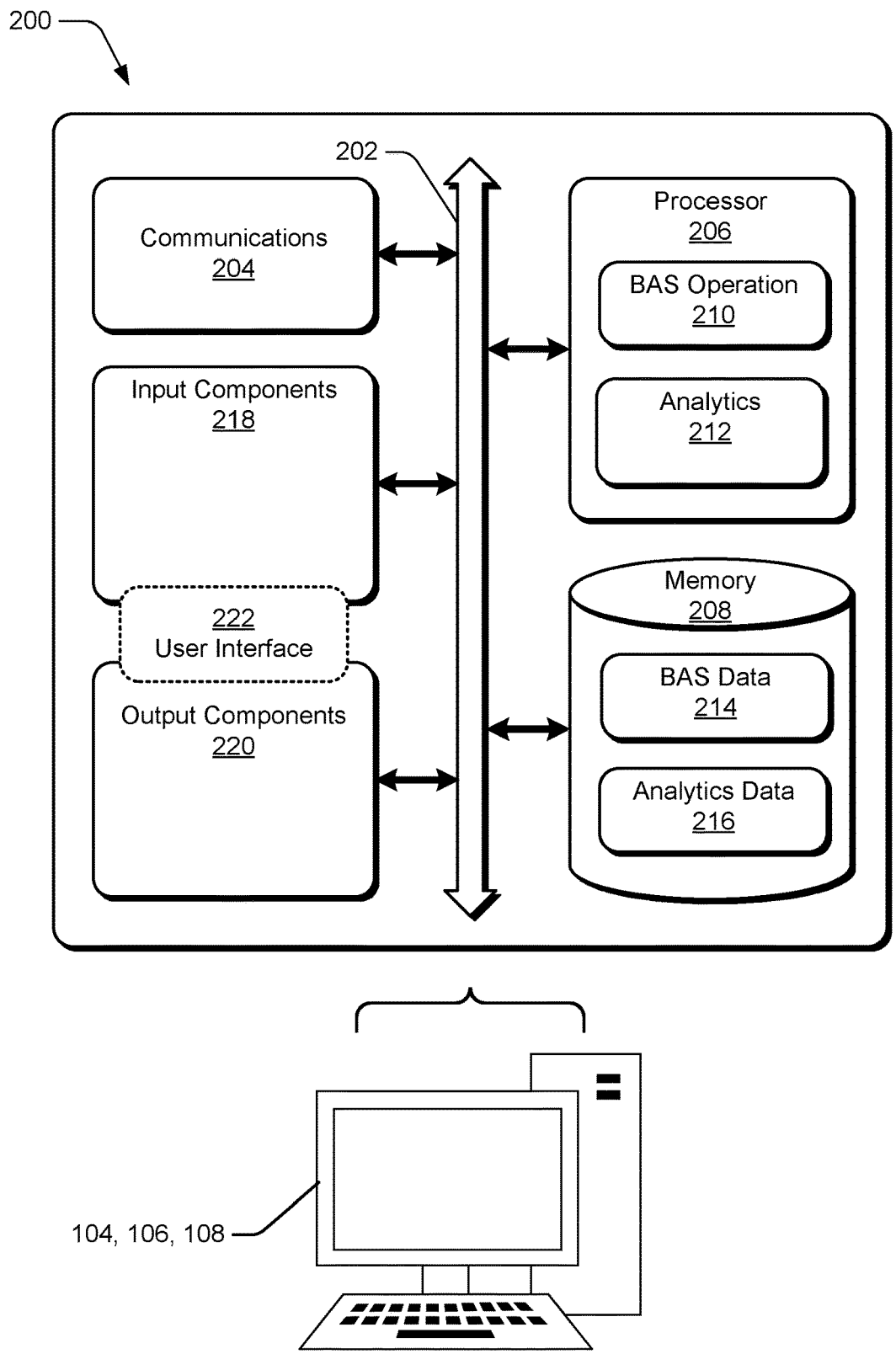
FIG. 2 is a block diagram of a management device representing an example implementation of one or more management level devices of FIG. 1.

FIG. 2 represents example device components 200 of a management level device or management device, such as the management workstation 104, management server 106, and/or remote management device 108, for the setting and/or changing of various controls of the automation and field level devices 120-126. Accordingly, FIG. 2 is an example representation of each device, i.e., the management device 104-108, or a combination of these devices. The device components 200 comprise a communication bus 202 for interconnecting other device components directly or indirectly. The other device components include one or more communication components 204 communicating with other entities via a wired or wireless network, one or more processors 206, and one or more memory components 208.

The communication component 204 is configured to receive data associated with one or more points of a site from, or otherwise manage, the automation and field level devices 120-126 ("automation controllers" and "field devices"). For example, the communication component 204 may receive data from automation and field level devices of the subsystems 112, 114. The communication component 204 may utilize wired technology for communication, such as transmission of data over a physical conduit, e.g., an electrical or optical fiber medium. For some embodiments, the communication component 204 may also utilize wireless technology for communication, such as radio frequency (RF), inflated, microwave, light wave, and acoustic communications. RF communications include, but are not limited to, Bluetooth (including BLE), ultrawide band (UWB), Wi-Fi (including Wi-Fi Direct), Zigbee, cellular, satellite, mesh networks, PAN, WPAN, WAN, near-field communications, and other types of radio communications and their variants.

The processor or processors 206 may execute code and process data received from other components of the device components 200, such as information received at the communication component 204 or stored at the memory component 208. The code associated with the BAS 100 and stored by the memory component 208 may include, but is not limited to, operating systems, applications, modules, drivers, and the like. An operating system includes executable code that controls basic functions, such as interactions among the various components of the device components 200, communication with external devices via the communication component 204, and storage and retrieval of code and data to and from the memory component 208.

Each application includes executable code to provide specific functionality for the processor 206 and/or remaining components of the management and/or automation and field level devices 104-108, 120-126. Examples of applications executable by the processor 206 include, but are not limited to, a building automation system ("BAS") operation module 210 and an analytics module 212. The BAS operation module 210 controls and manages the performance of the BAS for monitoring and controlling a building's mechanical and electrical equipment, including the automation and field level devices 120-126 associated with at least one of heating, cooling, circulating, lighting, security, fire devices, and the like. The functions of the BAS operation module 210 include conversion of data between automation level devices 120-122 and a management device 104-108. The analytics module 212 generates and analyzes analytical data, such as control schedules, trend reports, defined system hierarchies, and the like.

Data stored at the memory component 208 is information that may be referenced and/or manipulated by an operating system or application for performing functions of the management and/or automation and field level devices 104-108, 120-126. Examples of data associated with the BAS 100 and stored by the memory component 208 may include, but are not limited to, BAS data 214 and analytics data 216. The BAS data 214 includes information needed or desired to control and manage the operation and performance of the BAS. The analytics data 216 includes analytical data generated or analyzed by the analytics module 212, such as control schedules, trend reports, defined system hierarchies, and the like.

The device components 200 may include one or more input components 218 and one or more output components 220. The input components 218 and output components 220 of the device components 200 may include one or more visual, audio, mechanical, and/or other components. For some embodiments, the input and output components 218, 220 may include a user interface 222 for interaction with a user of the device. The user interface 222 may include a combination of hardware and software to provide a user with a desired user experience.

It is to be understood that FIG. 2 is provided for illustrative purposes only to represent examples of the device components 200 of the management and/or automation and field level devices 104-108, 120-126 and is not intended to be a complete diagram of the various components that may be utilized by the system. Therefore, the management and/or automation and field level devices 104-108, 120-126 may include various other components not shown in FIG. 2, may include a combination of two or more components, or a division of a particular component into two or more separate components, and still be within the scope of the present invention.

Figure 3:
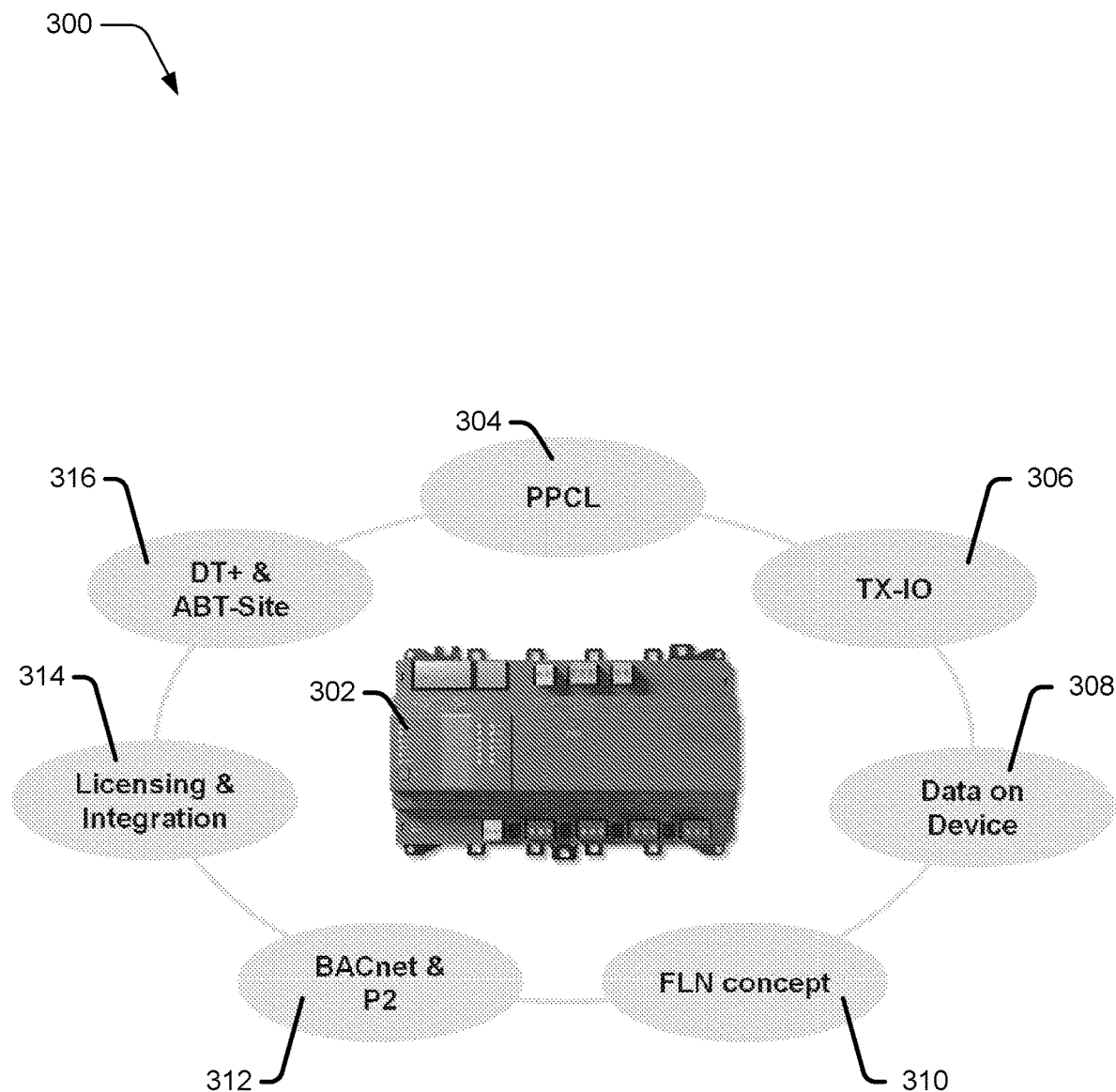
FIG. 3 is a planar view of a controller and its select features representing an example implementation of one or more automation level devices of FIG. 1.

Referring to FIG. 3, there is shown an example implementation 300 of one or more automation level devices in the form of an automation controller 302 and its select features. The select features include a programmable firmware 304, TX-IO support 306, data management 308, floor level network management 310, communication protocol support 312, licensing & integration support 314, and remote site & associated tool support 316. The programmable firmware 304 may be editable on-the-fly or in real time at a client or Web interface using a programmable language, such as PPCL. The TX-IO support 306 provides connection and operation of standard input-output to field devices. The data management 308 provides the programming and database tools available on the controller for editing, without special tools or database backups. The floor level network ("FLN") management 310 includes asynchronous master-slave (P1) and master-slave/token passing ("MSTP") communications for system integration and a migration path for an installed base. The communication protocol support 312 includes BACnet support for system-wide control and operations management through a single interface and P2 support for communications, service, and migration at the building level network ("BLN"). The licensing & integration support 314 includes licensing and integration needed for protocol implementation, drivers, and tools. The remote site & associated tool support 316 provide round trip workflow from a design tool to the controllers and changes made during commissioning are brought back to the design tool for as-builts.

The example implementation 300 of the automation level device or devices has advanced capabilities including BACnet Secure Connect ("BACnet/SC"), web interface, and upgrade features. The BACnet/SC provides for secure, encrypted, and authenticated BACnet communications to provide cybersecurity and minimize the risks of hacking of HVAC control systems. The web interface provides a secure web interface embedded in the controller, i.e., on board, for editing, commissioning, and servicing workflows of the controller firmware. The upgrade features allow cost effective upgrading of older hardware to enhanced or improved features. It should be noted that many features of the system, such as global data, are independent of BACnet/SC and may be used with other protocols as well, such as BACnet/IP.

The BACnet/SC provides a solution addressing several issues with conventional building automation focused IP networks, which are based on BACnet IP, including lack of IT friendliness/acceptance and lack of cybersecurity. In contrast to BACnet IP and BACnet MSTP, the BACnet/SC utilizes a highly secure datalink, such as BACnet over Secure Sockets. BACnet/SC uses IT industry standard TLS 1.3 encryption and certificate-based authentication, allowing BACnet to work more seamlessly and easily on IT networks. BACnet/SC eliminates some of the insecure and less IT acceptable methods used by BACnet/IP, such as the use of UDP, BBMD (BACnet Broadcast Management Device) broadcasts and dedicated static IP addresses. These issues have created many challenges to the acceptance of BACnet/IP used within IT sanctioned and managed networks.

Figure 4:
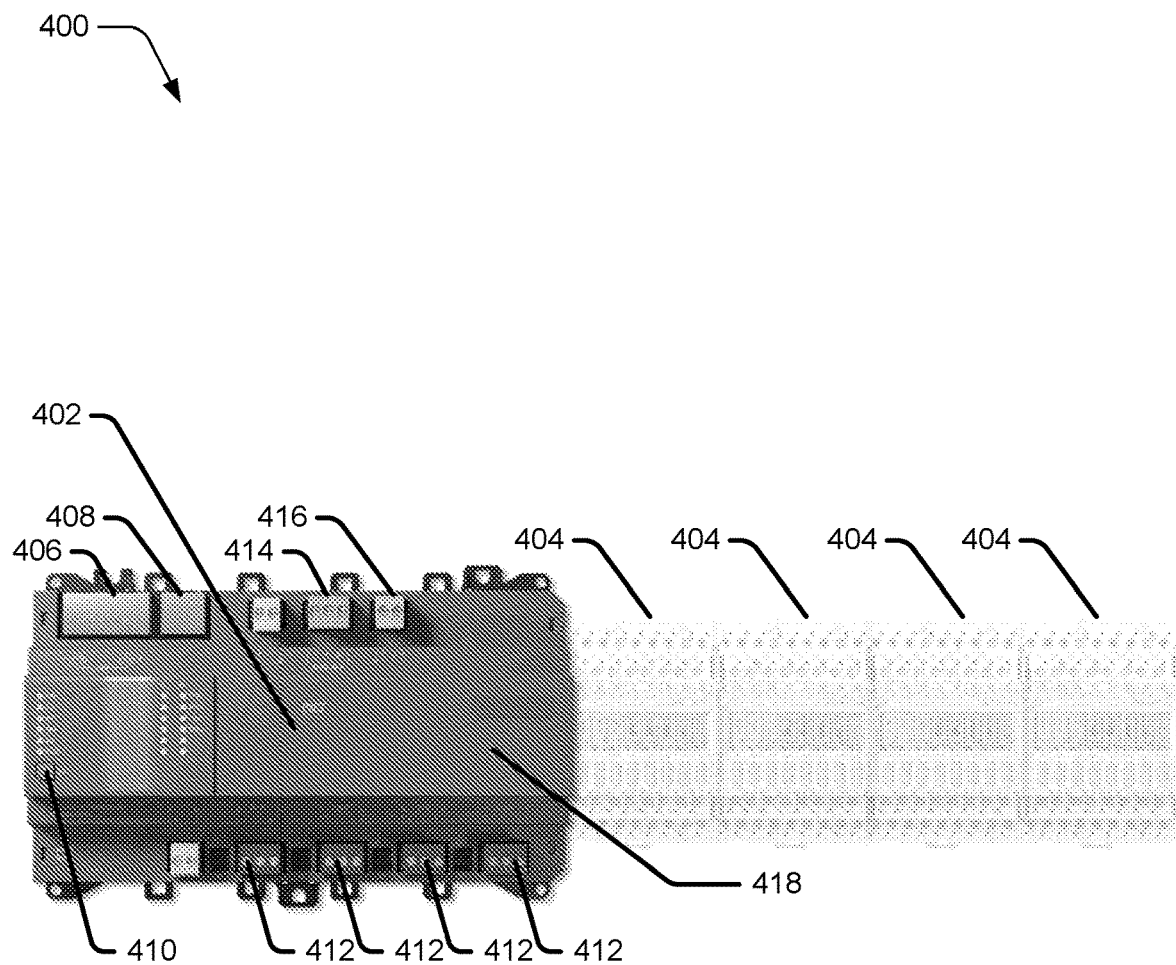
FIG. 4 is a planar view of a controller and its possible expansion modules representing an example implementation of one or more automation level devices of FIG. 1.

Referring to FIG. 4, there is shown an example implementation 400 of one or more automation level devices in the form of a controller 402 and its possible expansion modules 404. Functions of the controller 402 include B-BC listing, real time clock, support of physical I/O's via TX-IO modules, freely programmable with PPCL, BACnet/IP or /SC ALN communication, MS/TP & P1 FLN support, and HTML5 web interface for Eng., Com., and servicing. The controller 402 includes ethernet ports such as a switch 406 and an independent tool port 408. For example, two ethernet ports may act as the dual ports supporting daisy-chain or star configurations, and the third ethernet port may be an independent IP port. The controller 402 also includes a wireless interface 410 for local HMI that allows access the embedded web interface to manage the controller with a mobile device having secure, authenticated wireless access, such as a laptop, tablet or phone. The web interface may also available via an ethernet port 406, 408 for remote editing, as well as the wireless connection 410. The wireless connection 410 may include a button to enable temporary WLAN connection, the ability to disable the connection, and/or control tool connectivity for service. The controller 402 further includes multiple ports 412 for subnet connections, such as an RS-485 subnet. For some embodiments, the ports 412 may cover a variety of floor level networks, such as BACnet, P1, and integrations like Modbus. In addition, TX-IO expansion modules 404 maybe added to the controller 402 to provide more inputs, outputs, ports, and other connections to points of the building automation system to the controller. The controller 402 may also include a power connection 414, a DI connection 416, and/or a portable power source (e.g., battery) 418.

Figure 5:
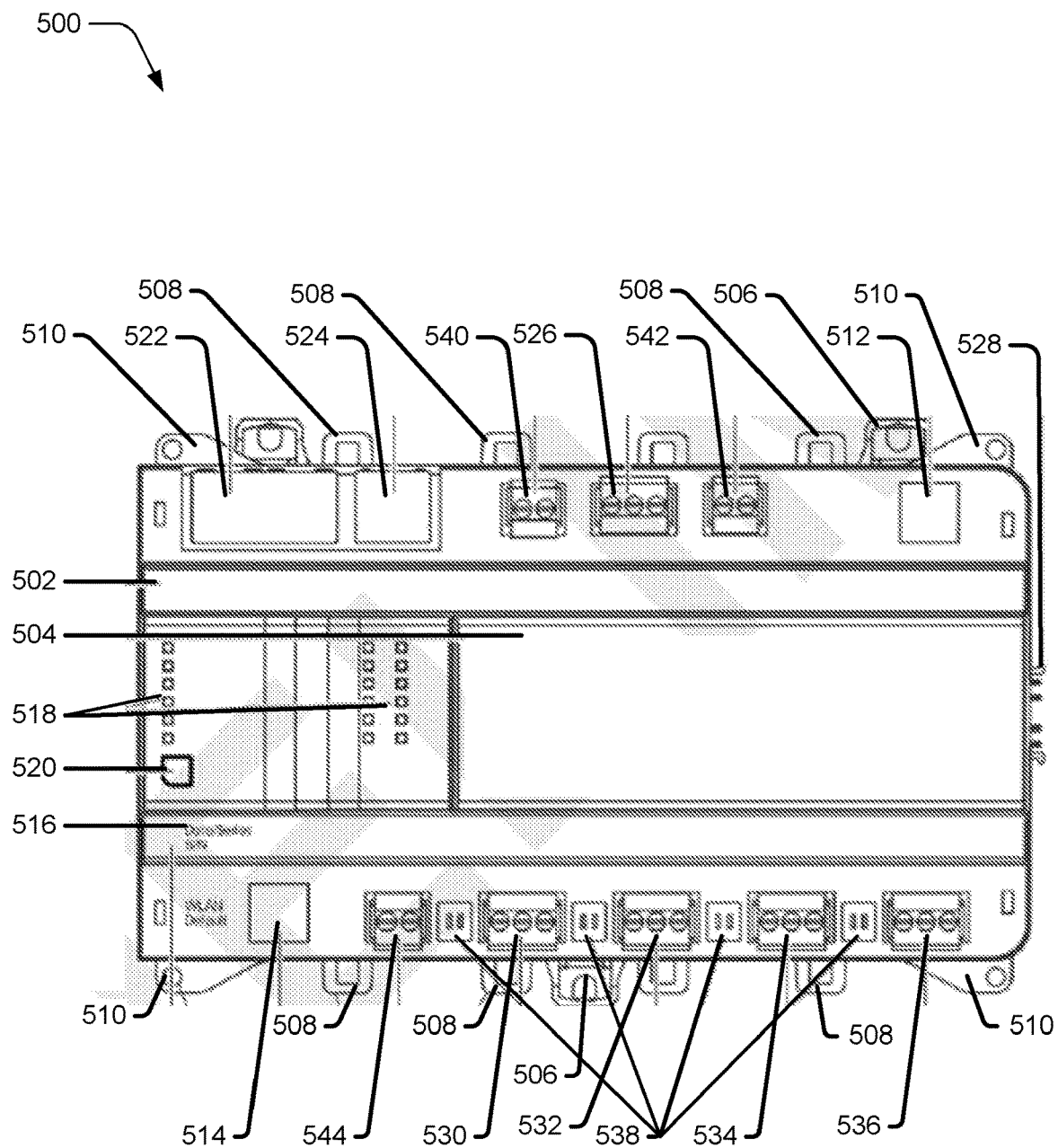
FIG. 5 is a schematic view of a modular automation station representing an example implementation of the automation level devices of FIG. 1.

Referring to FIG. 5, there is shown a schematic view of a modular automation station 500 representing an example implementation of the automation level device ("automation controller"). The modular automation station 500 includes a housing having a plastic housing portion 502, a battery cover 504, a slider 506 for mounting on DIN rails, eyelets for cable ties 508, and/or holes of wall/enclosure mounting 510. The housing may also include a data matrix code 512, a QR code 514 for default WLAN access description in technical data, and/or date/series and serial number 516. The modular automation station 500 also includes one or more of the following components: a visual indicator 518 for communication and state, a service button 520 for ID on network and WLAN on/off, an ethernet switch 522, an ethernet port 524, a power supply connector 526, a connector 528 for TX-I/O modules, a COM interface 530-536, and switches for bus termination and polarization 538. For some embodiments, the modular automation station 500 may include a KNX PI-link 540, a digital input 542, and/or an M-bus 544. Further details about the modular automation device 500 is provided by Appendix A provided below.

Figure 6:
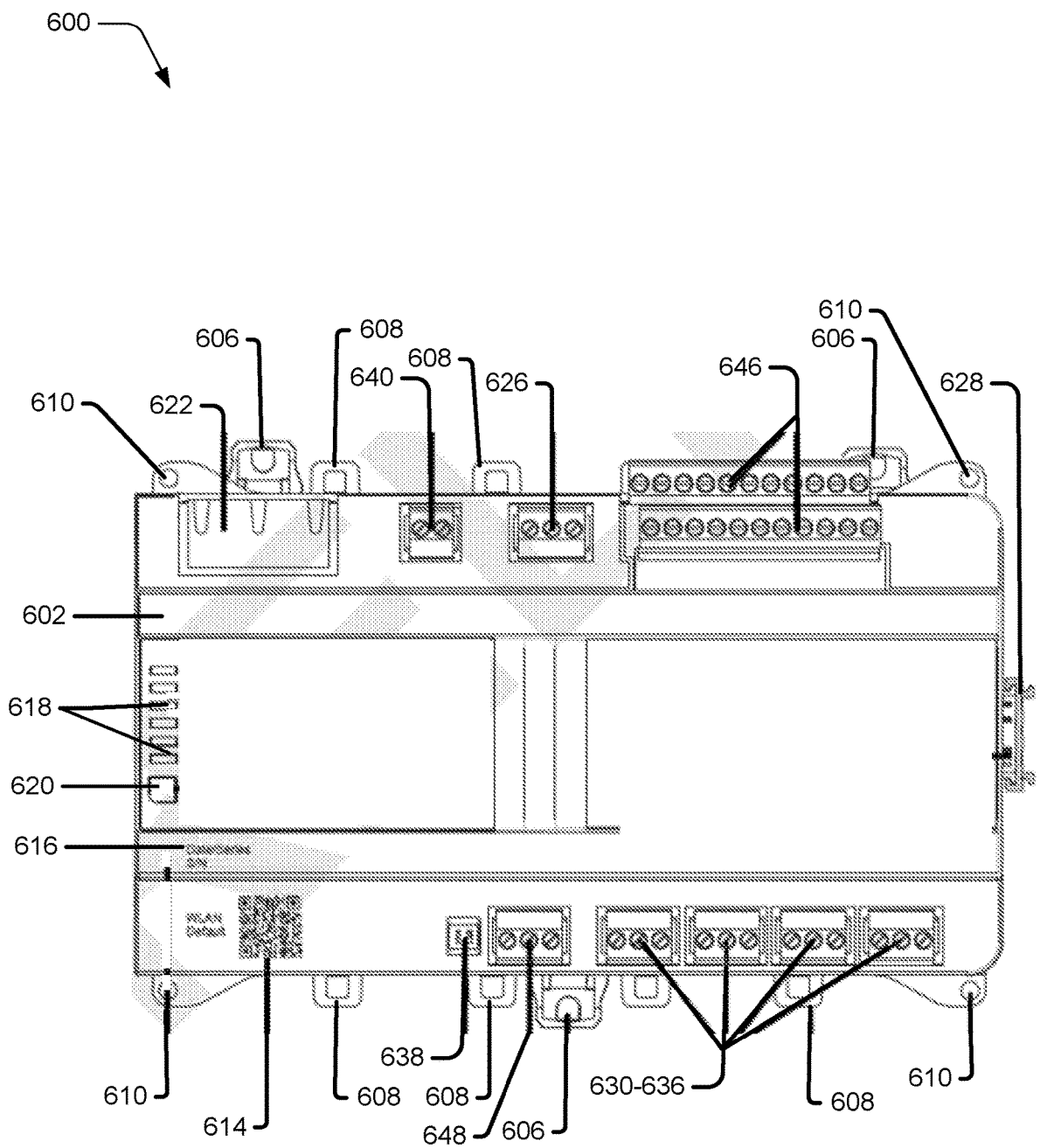
FIG. 6 is a schematic view of a compact automation station representing another example implementation of the automation level devices of FIG. 1.

Referring to FIG. 6, there is shown a schematic view of a compact automation station 600 representing another example implementation of the automation level device ("automation controller"). The compact automation station 600 includes a housing having a plastic housing portion 602, a slider 606 for mounting on DIN rails, eyelets for cable ties 608, and/or holes of wall/enclosure mounting 610. The housing may also include a QR code 614 for default WLAN access description in technical data and/or date/series and serial number 616. The compact automation station 600 also includes one or more of the following components: a visual indicator 618 for communication and state, a service button 620 for ID on network and WLAN on/off, an ethernet switch 622, a power supply connector 626, a connector 628 for TX-I/O modules, a relay outputs 630-636, and a switch for bus termination and polarization 638, and universal inputs/outputs 646 (which may include field device supply). For some embodiments, the compact automation station 600 may include a KNX PI-link 640 and/or one or more auxiliary connectors 648. Further information about the compact automation station 600 is provided by Appendix B provided below.

Figure 7:
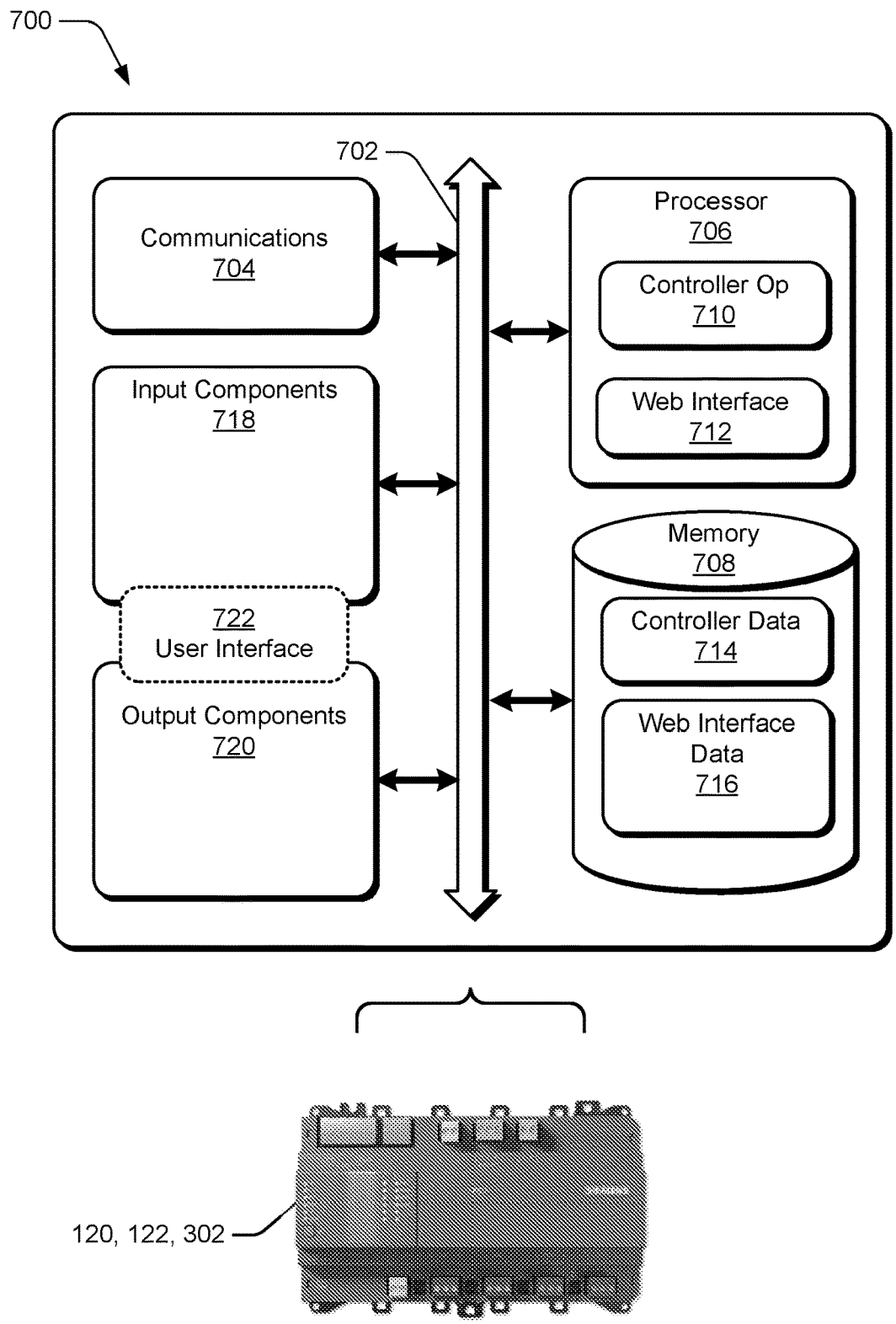
FIG. 7 is a block diagram of internal components of a controller representing an example implementation of the automation level devices of FIG. 1.

FIG. 7 represents example device components 700 of an automation level device 120, 122, 302 ("automation controller"), for monitoring and managing operations of one or more field level devices 124, 126. The device components 700 comprise a communication bus 702 for interconnecting other device components directly or indirectly. The other device components include one or more communication components 704 communicating with other entities via a wired or wireless network, one or more processors 706, and one or more memory components 708.

The communication component 704 is configured to receive data associated with one or more points of a site from, or otherwise manage, the field level devices 120-126. For example, the communication component 704 may receive data from field level devices 124, 126 and other automation level devices 120,122 of the subsystems 112, 114. The communication component 704 may utilize wired or wireless technology for communication, such as those described above for the management device(s).

The processor or processors 706 may execute code and process data received from other components of the device components 700, such as information received at the communication component 704 or stored at the memory component 708. The code associated with the BAS 100 and stored by the memory component 708 may include, but is not limited to, operating systems, applications, modules, drivers, and the like. An operating system includes executable code that controls basic functions, such as interactions among the various components of the device components 700, communication with external devices via the communication component 704, and storage and retrieval of code and data to and from the memory component 708.

Each application includes executable code to provide specific functionality for the processor 706 and/or remaining components of the automation level devices 120, 122, 302. Examples of applications executable by the processor 706 include, but are not limited to, a controller operation module 710 and a web interface module 712. The controller operation module 710 controls and manages the operational features of the automation level device 120, 122, 302, such as global data management, name resolution management, and team filtering management. The web interface module 712 controls and manages the operational features of the web interface of that automation level device 120, 122, 302, such as device commissioning, trend data management, and node table management.

Data stored at the memory component 708 is information that may be referenced and/or manipulated by an operating system or application for performing functions of the management and/or automation and field level devices 104-108, 120-126. Examples of data associated with the BAS 100 and stored by the memory component 708 may include, but are not limited to, controller data 714 and web interface data 716. The controller data 714 includes global data, name data, and team filtering data. The web interface data 716 includes commissioning data, trend data, and one or more node tables.

The device components 700 may include one or more input components 718 and one or more output components 720. The input components 718 and output components 720 of the device components 700 may include one or more visual, audio, mechanical, and/or other components. For some embodiments, the input and output components 718, 720 may include a user interface 722 for interaction with a user of the device. The user interface 722 may include a combination of hardware and software to provide a user with a desired user experience, such as a physical button for wireless access to the web interface.

It is to be understood that FIG. 7 is provided for illustrative purposes only to represent examples of the device components 700 of the automation level devices 120, 122, 302 and is not intended to be a complete diagram of the various components that may be utilized by the system. Therefore, the automation level devices 120, 122, 302 may include various other components not shown in FIG. 7, may include a combination of two or more components, or a division of a particular component into two or more separate components, and still be within the scope of the present invention.

Figure 8:
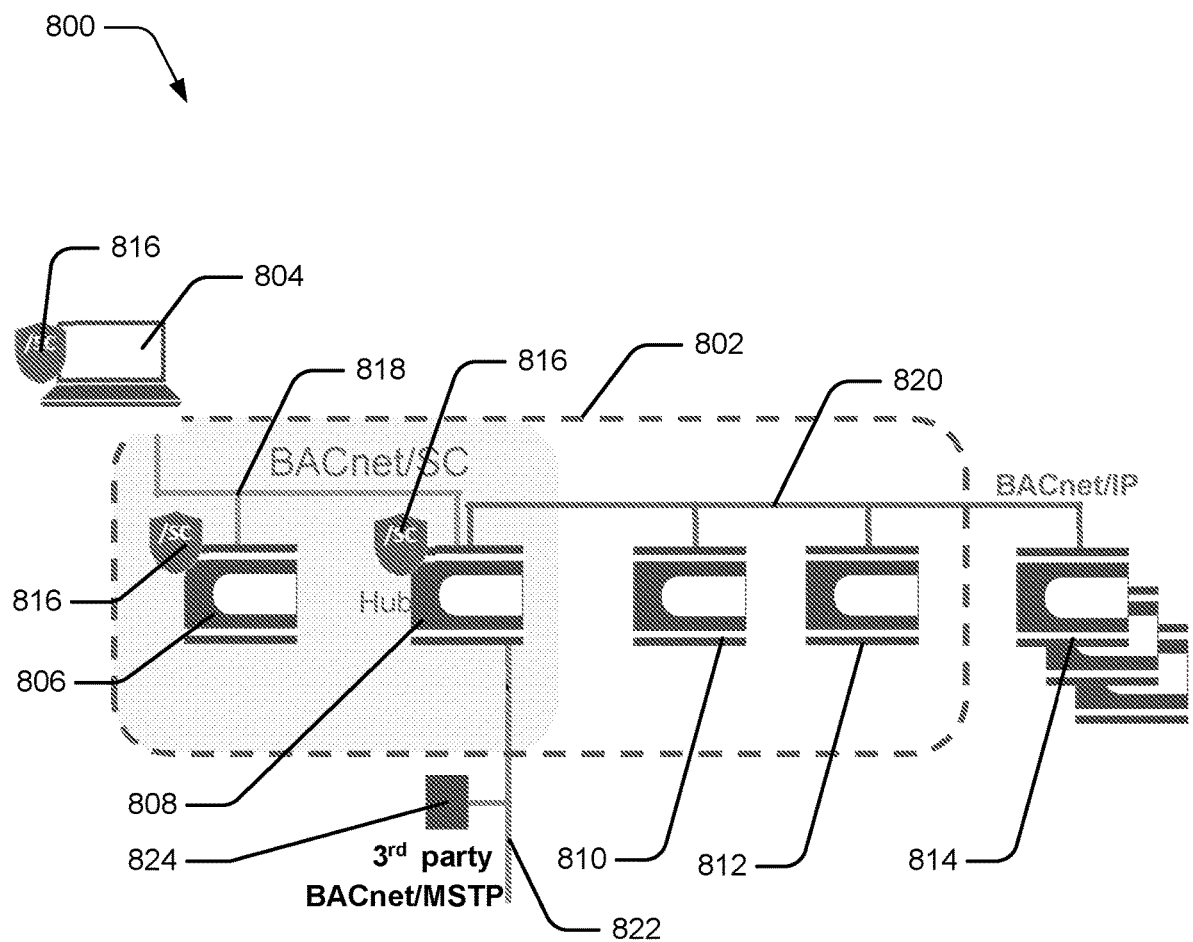
FIG. 8 is a diagrammatic view of a logical network of controllers representing an example implementation of the automation level devices of FIG. 1.

Referring to FIG. 8, there is shown a partial system 800 having a logical network 802 of controllers representing an example implementation of a configuration of the automation level devices. The partial system 800 has an implementation of a BACnet Secure Connect ("BACnet/SC") solution, such as the ASHRAE standard for Secure Connect, that includes a management device 804 and multiple automation level devices ("automation controllers"). The automation controllers include at least one secure connect controller 806, 808 and some embodiments may include one or more non-secure connect controllers 810-814. Icons 816 signify BACnet/SC with full encrypted BACnet communications.

The secure connect controllers 806, 808 are linked by a BACnet/SC network 818. For those embodiments with non-secure connect controllers 810-814, the non-secure connect controllers may be coupled to a secure connect controller 808 by a non-BACnet/SC network 820. Secure connect controllers 806, 808 may only communicate with each other in response to being associated with right certificates for authentication. The BACnet/SC standard supports backward compatibility to older BACnet link layers, and each secure connect controllers 806, 808 may serve as a BACnet router between BACnet/IP and BACnet/SC, as well as between MSTP and BACnet/SC. For some embodiments of the partial system 800, the logical network 802 may include a connection 822 one or more $3^{rd}$ party MSTP or IP devices 824. The built-in routers allow for connection of the $3^{rd}$ party devices 824 to couple to the logical network 802.

BACnet/SC provides transport layer security ("TLS") encryption, certificates for authentication and decryption, hub function, backup hub function, routing between BACnet/SC and non-BACnet/SC. Certificates for authentication and decryption may be managed by an automation level device, a management level device, or a remote device. An example of the hub function is a hub/spoke concept where the hub mediates all traffic between the other /SC devices and authenticates all /SC devices preventing unauthorized access to the BACnet/SC encrypted network. The backup hub function serves the function of taking over control of a hub in response to a failure by the primary hub. For routing between BACnet/SC and a non-BACnet/SC, examples of the non-BACnet/SC includes BACnet/IP and MSTP.

Figure 9A:
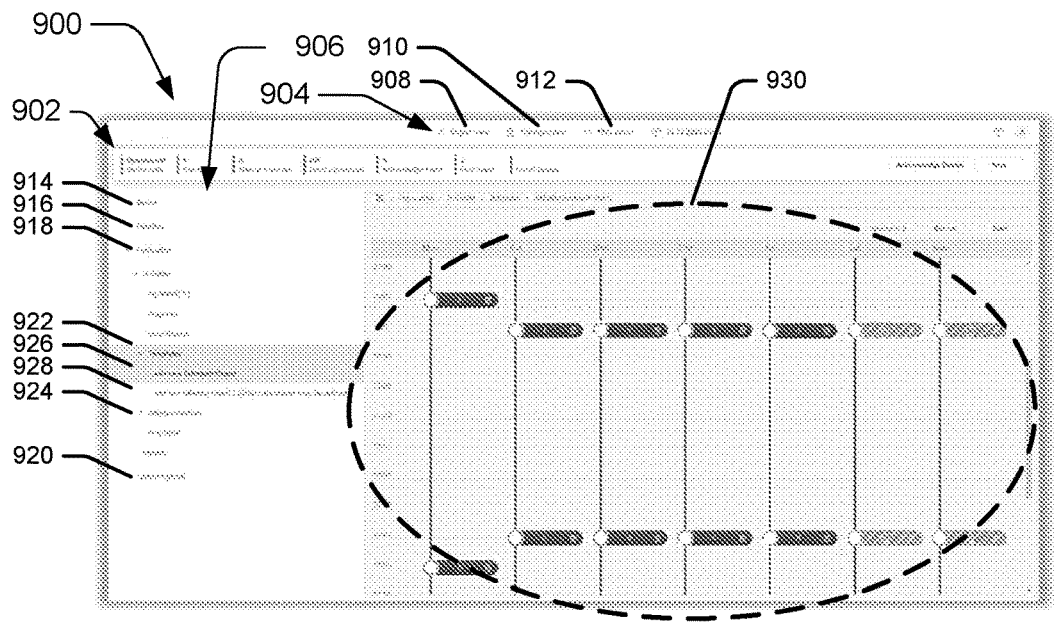
FIGS. 9A and 9B are screen shots representing example implementations of operations of one or more management level devices of FIG. 1.
Figure 9B:
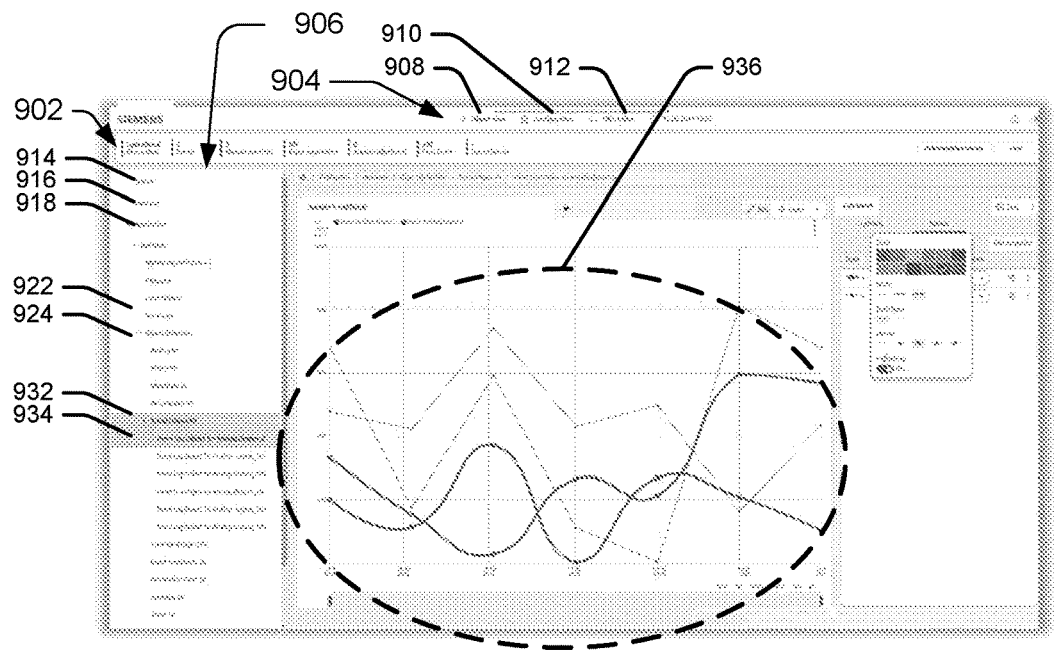

Referring to FIGS. 9A and 9B, there are shown screen shots of a web interface 900 representing example implementations of operations of one or more management devices. The web interface 900 is a firmware-embedded tool of the automation controller for commissioning, configuration, and service tasks. For example, the web interface may include the web interface module 712 and the web interface data 716. For some embodiments, the Web interface 900 may be based on a markup language used for structuring and presenting content on the World Wide Web, such as HTML5. The web interface 900 further includes a responsive graphical interface which allows it to scale well on different device types including, but not limited to, computing devices, laptops, tablets, and smartphones. The web interface 900 is also secure, by utilizing encryption and authentication as well as password protected user logins with different levels of user privileges. For some embodiments, the web interface 900 may be accessible over a network by a wired connection through an ethernet IP connector of the automation controller. For some embodiments, the web interface 900 may be accessible by direct wireless connection to a wireless service port of the automation controller. For some embodiments, the web interface 900 may be accessible by a wired connection to a tool port of the automation controller, such as a location where temporary wireless usage is not allowed. A secure connection to the web interface allows for viewing and manipulation of system information, such as global data.

Regarding FIG. 9A in particular, the web interface 900 includes a status bar 902, multiple views 904, and a selection tree 906. The status bar 902 includes operational device state, number of events, number of manual override, status of event suppression (e.g., on or off), number of acknowledge event, number of fault even, and out of service information. The views 904 include an object view 908, a configuration view 910, and a PPCL editor 912. The selection tree 906 includes device information 914, field bus information 916, application information 918, and common global application 920. The application information 918 may include various information about devices, programs, objects, object templates 922, object collection 924, and functional information associated with the automation controller. The application information 918 allows for modifying device and object properties, adding trends to objects, and adding event enrollments to objects. For example, the web interface 900 may allow for the selection of a template 922 to add a schedule object 926 or calendar object 928 and present a template representation 930 to add the schedule or calendar object.

Regarding FIG. 9B in particular, the selection tree 906 of the web interface includes application information 918, and the application information includes object collection 924. The object collection 924 application displays groupings of like objects. The list includes all local objects, PPCL objects, team objects, and controller objects. An item in the collection may be selected to view objects, modify object properties, add trends, add event enrollments, and delete objects. The object collection 924 may further include trend objects 932, particularly a trend log object 934 for each data input and/or data output of the corresponding automation controller. The web interface 900 may allow for the selection of one or more trend log objects 934 and present a graphical trend viewer 936.

The trend view 936 provides for viewing graphic historical point data, customizing graphs, comparing points on the same graph, and exporting trend values. A trend log object saves a record of a physical or virtual object's behavior so changes to the object may be monitored over time. The purpose of a trend log is to provide historical data about an object's performance. Trend objects may be created using the templates application. Thus, the template may be selected to add data into the template prior to creation, or add data to the object after creation.

As stated above in reference to FIG. 9A, the web interface 900 may provide information about common global application 920 associated with the automation controller. A device may be designated as a global data server at the web interface 900 or by another source, such as a management device 104-108. Objects are provided by the local objects page or in the corresponding category on the object collection page. For some embodiments, calendar objects may be provided by the common global application 920, such as calendar view, of the web interface 900.

The common global application 920 allows you to make changes to the calendar view and a node table. A global data server is a device that provides synchronization updates to global data client devices. Changes made on the server are synchronized to the configured clients on the same BLN. There can only be one global data server per BLN. A global data client is a controller that is configured to receive updates from the global data server. Changes may be made from a global data server to a global data client using the node table editor or calendar.

Device object properties may be modified to configure a device as a global data server. Default device object configuration is set for global data clients. The BLN name must match between the server and clients. Global data client devices may be added to the server's node table by using the node table editor to complete configuration.

The device object may be configured as a global data server anywhere that it is shown in the web interface, such as in an application or the node table. One controller may be configured as a global data server at web interface of the corresponding automation controller.

A device is added to the node table is a global data client. Global data clients and their global data server will belong to the same BLN. In order to synchronize, global data clients and the global data server may use the same BLN name.

The calendar view displays a list of calendars that are synchronized between a global data server and its global data clients. Changes to the calendar view may be made on the global data server. Changes made in the server controller will be synchronized to the clients.

A global data server automatically synchronizes to its global data clients. Data from calendar and node table are synchronized from the global data server to the global data clients. If the global data server restarts, global data clients retain the data from the last update. Once the server is back online, clients will re-synchronize with the most recent data from the server.

Figure 10:
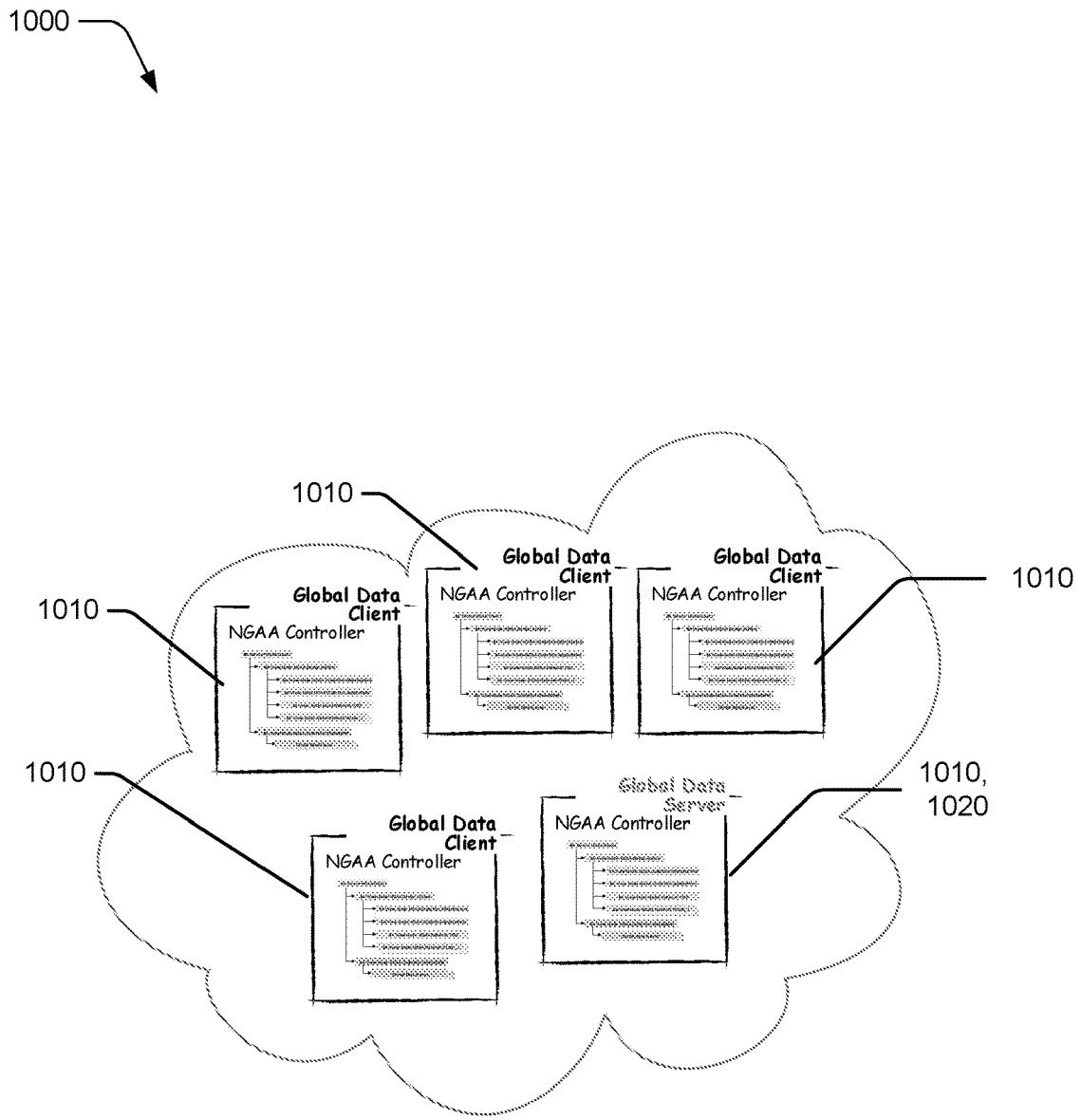
FIG. 10 is diagrammatic view of an abstract network of controllers representing an example implementation of the automation level devices of FIG. 1.

Referring to FIG. 10, there is shown diagrammatic views of an abstract network of controllers representing an example implementation of the global data sharing for the automation level devices. The global data sharing is an approach for a global sharing network 1000 having multiple automation level devices 1010 ("automation controllers"). For the global data sharing, a particular device of the automation level devices 1010 is designated as a global data server 1020 for the global sharing network 1000. Certain data is considered system-level global data, in that it pertains to the system as a whole and not individual devices. Examples include, but are not limited to, host names and IP addresses of field panels on the network (i.e., the node table) and global calendars. Other examples include, but are not limited to, time zone, UTC offset, remote & local ping intervals, APDU timeout, and a new global device object property for BLN-wide event notification suppression.

A global data network 1000 provides synchronized images of a predefined set of objects across all controllers on an IP automation level network. The global data network 1000 also synchronizes a predefined set of mapped data grains on a mixed network of controllers having different content and organization of global data. In an automation controller, any object under the global data collection as indicated by the web interface is handled as global data. In normal steady-state operation, the content of the global data collection may be, and should be for some embodiments, the same in all controllers. When change have been synced, the global data collection should match across the network. For some embodiments, the system may sync the global data across the network over a syncing time period in response to the occurrence of one or more changes. In each global data network 1000, one controller will be designated as the global data server 1020; all other controllers are global data clients. Global data is writable over the network 1000 in the global data server 1020 and read-only in global data clients.

The global data server 1020 is responsible for managing global data change counts. One global change count for the server's global data image as a whole. The global data server 1020 increments this counter each time any global data grain is updated. Subordinate change counts may be added as needed. The combination of the global change count and the subordinate change counts is referred to as the change count hierarchy.

Figure 11A:
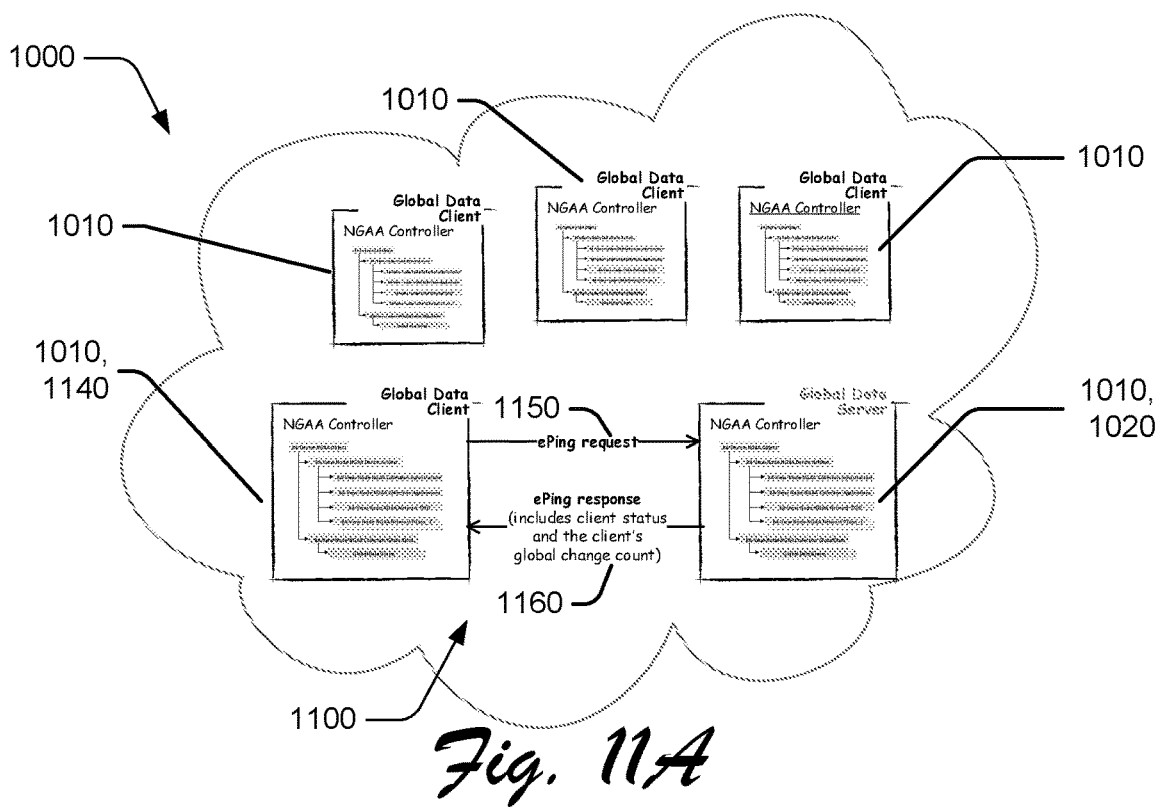
FIGS. 11A and 11B are diagrammatic views of the abstract network of FIG. 10 representing example implementations of normal network management.

Referring to FIG. 11A, there is shown a diagrammatic view of a global data network 1000 representing another example implementation of the global data sharing for the automation level devices. During a first ePing sequence 1100 of the normal network management, a global data client 1140 may send an ePing request 1150 to the global data server 1020. The global data client 1140 may receive the updated global change count from the global data server 1020 in the server's ePing response 1160, in response to the ePing request 1150. If the global change count received from the server is higher than the client's global change count, the client's global data image is out of date. The client is then responsible for scanning the server's change count hierarchy and updating its global data image. If the global change count received from the server is equal to the client's global change count, no synchronization action will occur. In the unlikely event that the global change count received from the server is lower that the client's global change count, a synchronization error exists. This may occur if the global data server is loaded with an old database image. If the synchronization error state persists through a predefined number of ePings, the client 1040 will provide an error indication.

Figure 11B:
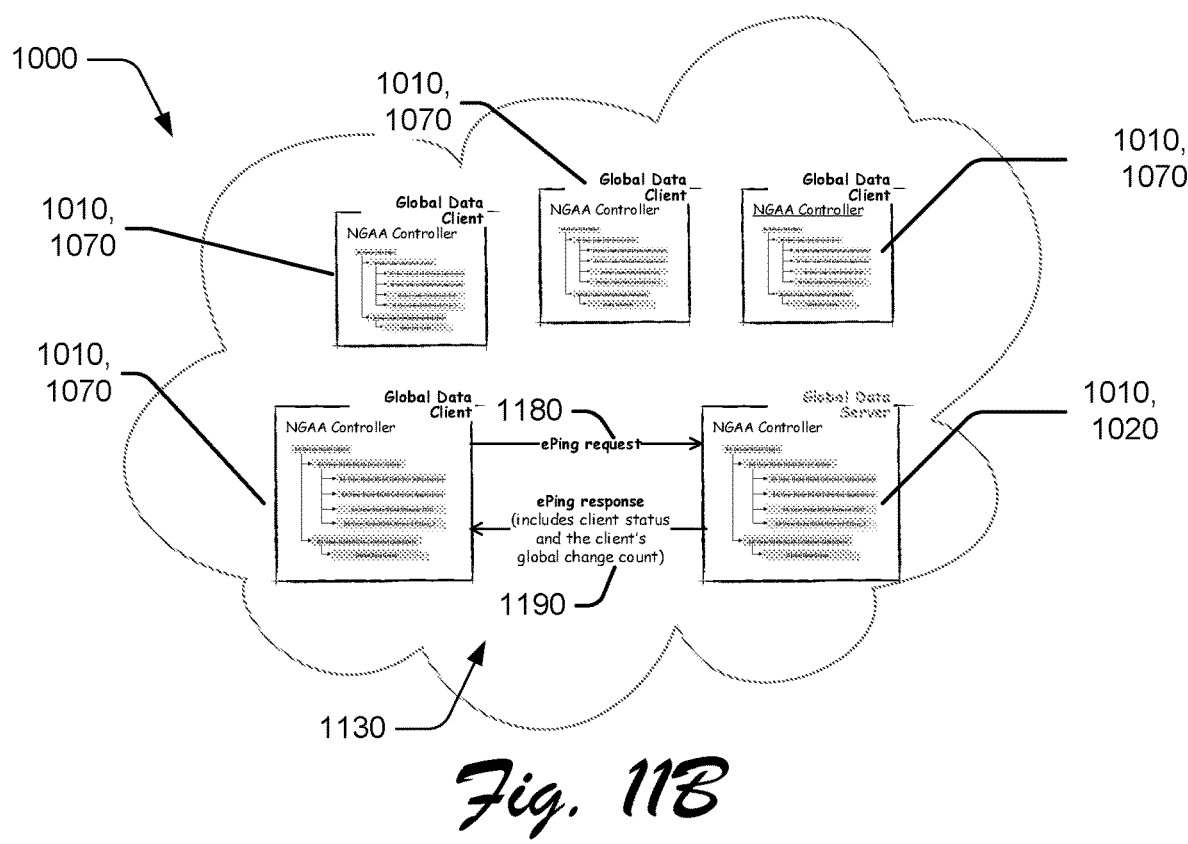

Referring to FIG. 11B, there is shown a diagrammatic view of a global data network 1000 representing another example implementation of the global data sharing for the automation level devices. Relevant to global data, the name resolution is facilitated by the node table, giving each device knowledge of other devices on the BLN. During a second ePing sequence 1130 of the normal network management, the global data server 1020 may send an ePing request 1180 to the global data clients 1070. The global data server 1020 receives the updated global change count from each global data client 1070 in each client's ePing response 1090, in response to the ePing requests 1180. In the unlikely event that the global change count received from the client is greater that the server's global change count, a synchronization error exists. This may occur if the global data server is loaded with an old database image. If the synchronization error state persists through a predefined number of ePings, the server 1020 will provide an error indication.

Referring again to FIG. 9B, the automation level controller may allow for name resolution in which names of objects for devices associated with a building automation system are synchronized by device object references. For example, at the web interface 900, the trend log objects 924 may include a field for object name reference where a given object name may be entered. The automation level controller, or more particularly a processor or module of the controller, will determine automatically the controller associated with the name, whether local or at another controller. In particular, the automation level controller determines whether the specified name is used by any controller of the building automation system. If so, then the automation level controller identifies the identification associated with the name. For one embodiment, the automation level controller requests name resolution for a particular name to each of the other controllers one at time until a controller responds that the name is used, or all controllers have been contacted. For another embodiment, the automation level controller requests name resolution for one or more names (i.e., a bulk list of names) to each of the other controllers one at time until all names of the bulk list are resolved, or all controllers have been contacted.

Figure 12:
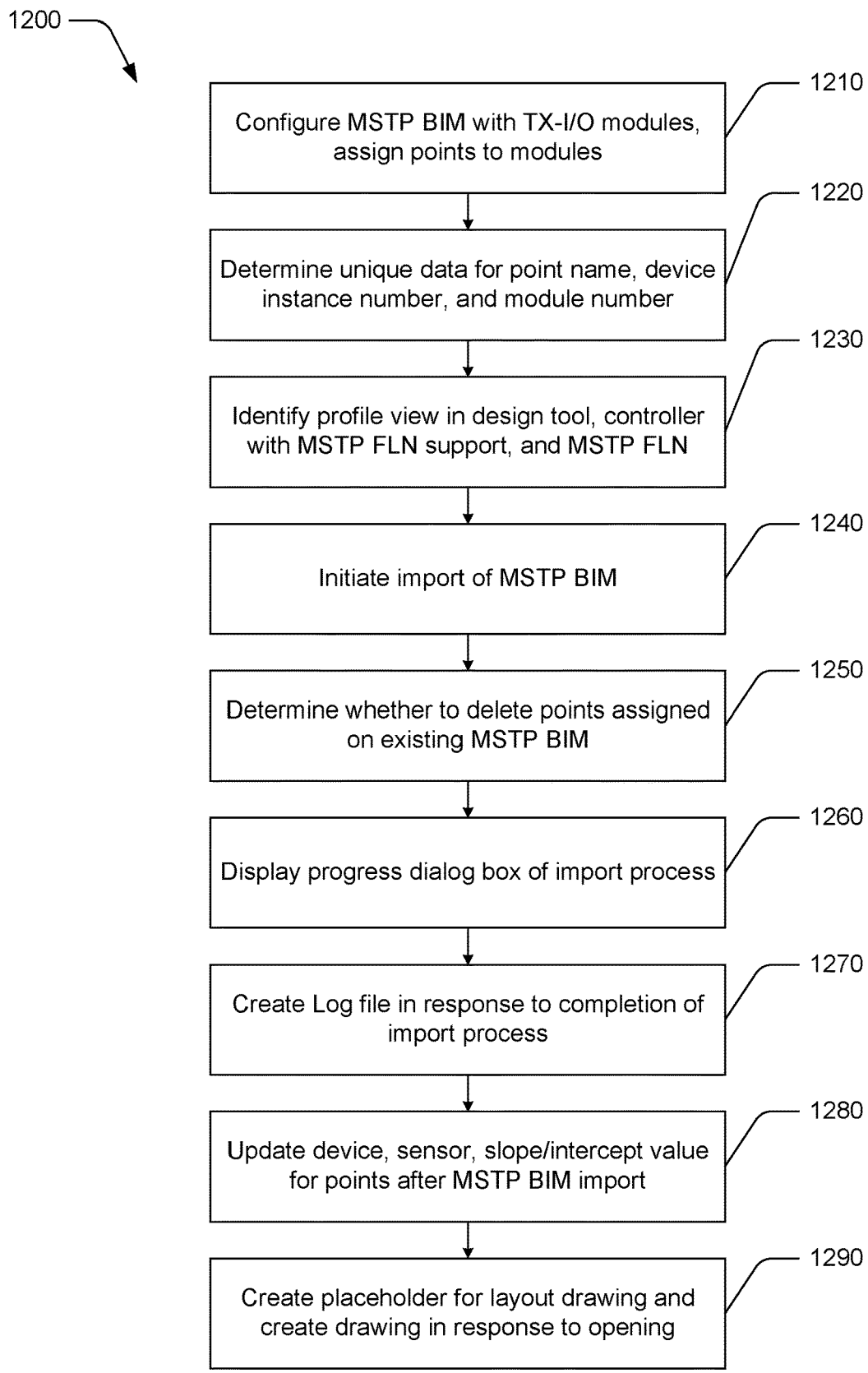
FIG. 12 is a flow diagram of a design tool for importing a bus interface module and assigned point to a remote site.

Referring to FIG. 12, there is shown a flow diagram of a design tool for importing a bus interface module and assigned point to a remote site. For some embodiments, the design tool may utilize a peer-to-peer, multiple master protocol based on token passing between devices on the network. For example, the design tool may import all BACnet master slave token passing (MSTP) bus interface module (BIM) with TX-I/O modules and assigned points configured in the remote site. The BACnet MSTP is a protocol for relaying and exchanging information between building devices. The design tool may be configured before performing the import process. Options to configure include setting folders/paths and default units, providing branch information (such as branch number, address, phone, fax and tax ID, setting up ATTSIN and ATTSOUT default and overwrite behaviors, and defining directory structures for a CAD symbols library and support folders.

The automation level controller also couples to another device, such as the management device 104-108, so that a design tool may convert hardware and software related data associated with a first data protocol for an automation controller to hardware and software related data associated with a second data protocol for the remote device or site. For example, the design tool allows the import of all MSTP BIM with TX-I/O modules and assigned points configured in the remote device. In a project, the MSTP BIM is configured with TX-I/O modules and points are assigned to the modules (1210). Unique data is entered in the project and job including point name, device instance number, and module number for TXIO and MAC address for BIM on the same FLN network (1220). A profile view is selected in the design tool, a controller with MSTP FNL support is added, and a MSTP FLN with appropriate network number on which to import MSTP BIM is added (1230). From a file menu, a selection is made to import from the remote device (1240). For some embodiments, existing points in the job assigned on all MSTP BIM module(s) are deleted, such as those points not in sync with the project (1250). For some embodiments, the existing points may not be deleted. For some embodiments, a progress dialog box of the import process may be displayed or otherwise identified (1260). When the import process is complete, the design tool creates a log file, which is stored at a default location (1270). For some embodiments, a log file may show the details of the import. After the MSTP BIM is imported, the device, sensor, slope/intercept values for the points may be updated (1280). Thereafter, a placeholder for the layout drawing may be created, and a drawing may be created in response to a selection of the placeholder (1290). When the drawings space is full based on the number of modules which can fit on a single rail, the design tool may add another empty drawing file.

Figure 13A:
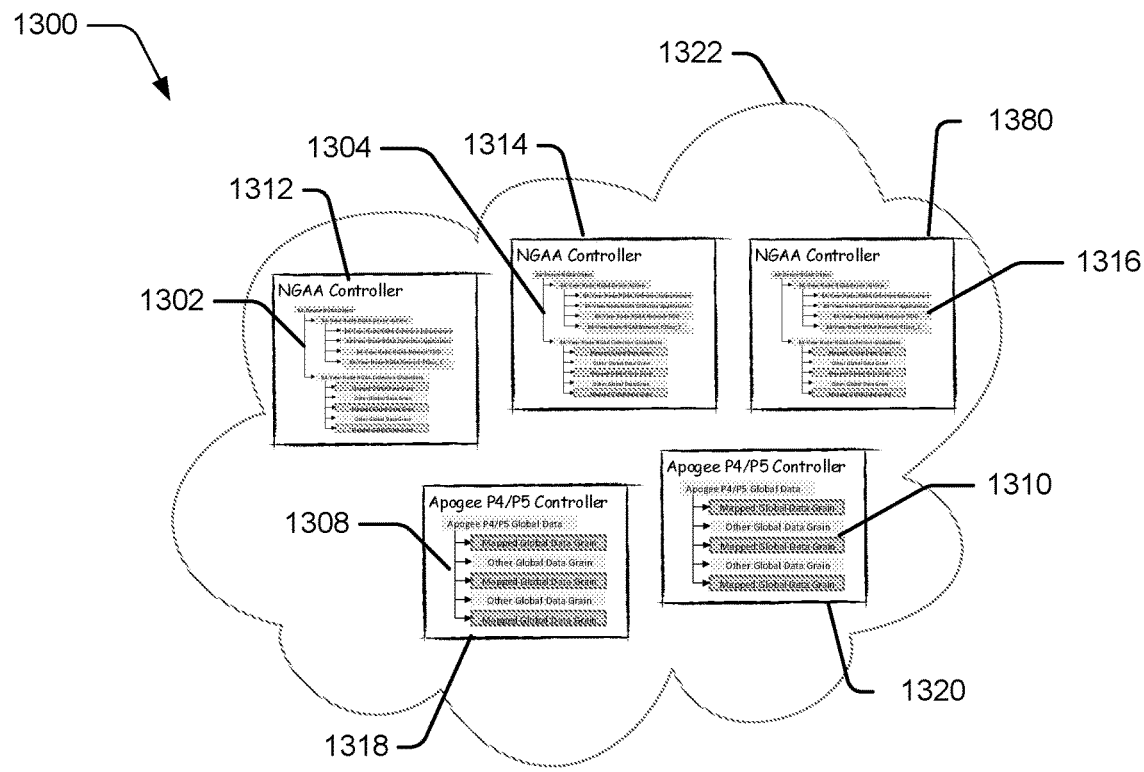
FIG. 13A and 13B are diagrammatic views of the abstract network of FIG. 10 representing an example implementation a distribution of global data.
Figure 13B:
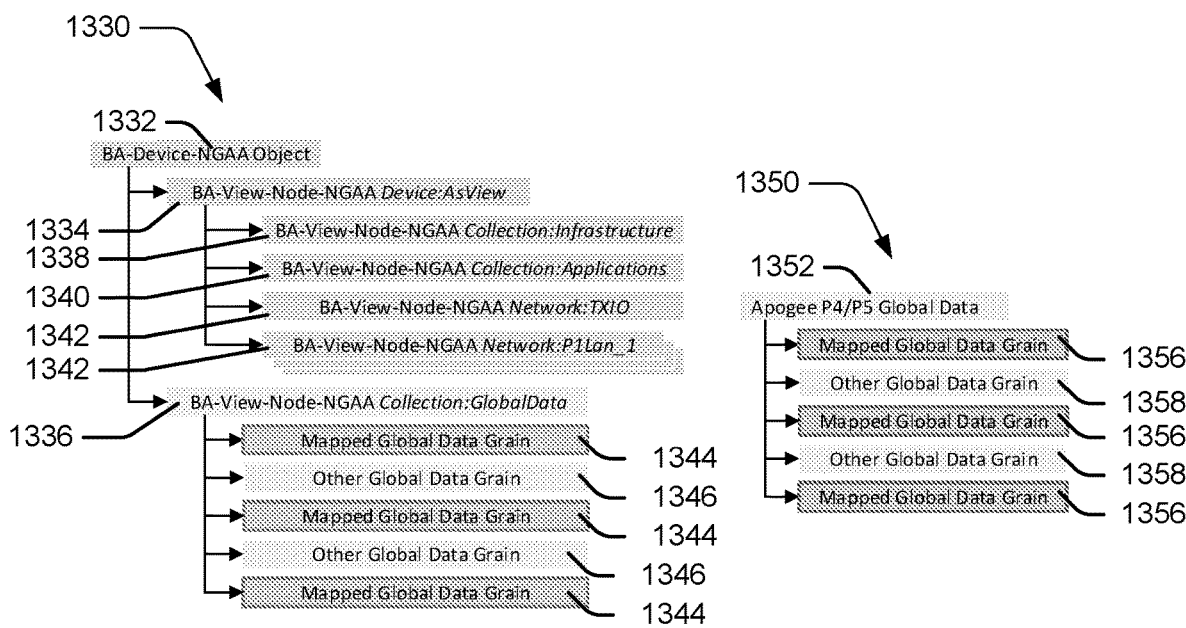

Referring to FIGS. 13A and 13B, there are shown a distribution of global data for the system 1300. A node table may track the field devices of the network as well as properties and values associated with each device. A grain type is a type of global data contained in a grain, as categorized by a database type, such as Destination, Calendar, Node Table, etc. A grain is a unit of global data which is distributed as a whole. A grain may be an entire grain type, such as the Node Table, or a record within a grain type, such as a Destination.

Referring specifically to FIG. 13A, one object of the global data system 1300 is to provide synchronized images or content 1302-1310 of a predefined set of objects across all field devices, such as controllers 1312-1320, on an IP automation-level network ("ALN") 1322. In a field device, any object under the global data collection is handled as global data. In normal steady-state operation, the content 1302-1310 of the global data collection is the same or similar in all controllers 1312-1320. Another object of the global data system is to synchronize a predefined set of mapped global data grains of images or content 1302-1310 on a mixed network of controllers, i.e., such as first controllers 1312-1316 vs second controllers 1318, 1320. For the mixed network of controllers, the content and organization of global data may be different between the different types of controllers. In other words, not all grains will be mapped and synchronized between controller types.

Referring specifically to FIG. 13B, each image or content 1330 of a first controller 1312-1316 has similarities to, and differences from, the image or content 1350 of each second controller 1318, 1320. The image or content 1330 of each first controller 1312-1316 represents a device object 1332 that includes device data 1334 and global data 1336 associated with that particular device object. The device data 1334 may include subdata such as, for example, infrastructure data 1338, applications data 1340, and network data 1342. The global data of each first controller 1312-1316 may include first mapped global data grain 1344 and other first global data grain 1346. The image or content 1350 of each second controller 1318, 1320 represents a device object 1352 that includes global data 1356 associated with that particular device object. For some embodiments, the image or content 1350 of each second controller 1318, 1320 may also include device data (not shown). The global data of each second controller 1318, 1320 may include second mapped global data grain 1356 and other second global data grain 1358.

Figure 14:
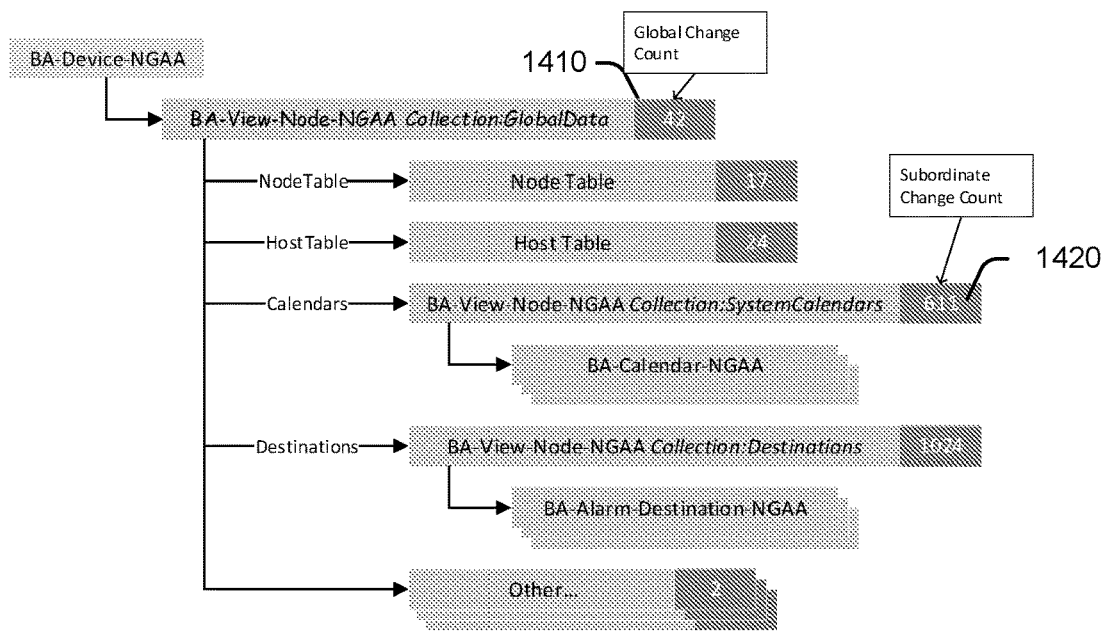
FIG. 14 is a diagrammatic view of the abstract network of FIG. 10 representing an example implementation change counts for global data.

Referring to FIG. 14, there is shown a representation of change counts 1400 for global data. The global data servers are responsible for managing global data change counts. To support synchronization of global data, the global data server manages change counts. In particular, there is one global change count 1410 for the server's global data image as a whole. The global data server increments this counter each time any global data grain is updated. Subordinate change counts 1420 are generated as needed. The combination of the global change count 1410 and the subordinate change counts 1420 is referred to as the change count hierarchy.

Figure 15A:
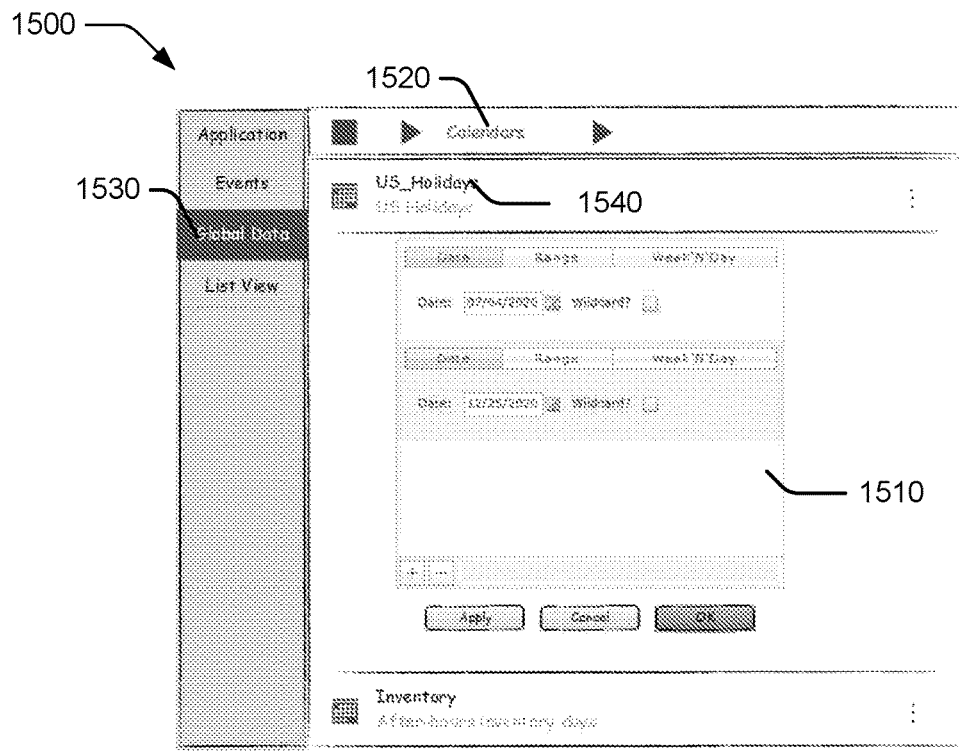
FIG. 15A and 15B are diagrammatic views of the abstract network of FIG. 10 representing an example implementation of editing global data at a global data server.
Figure 15B:
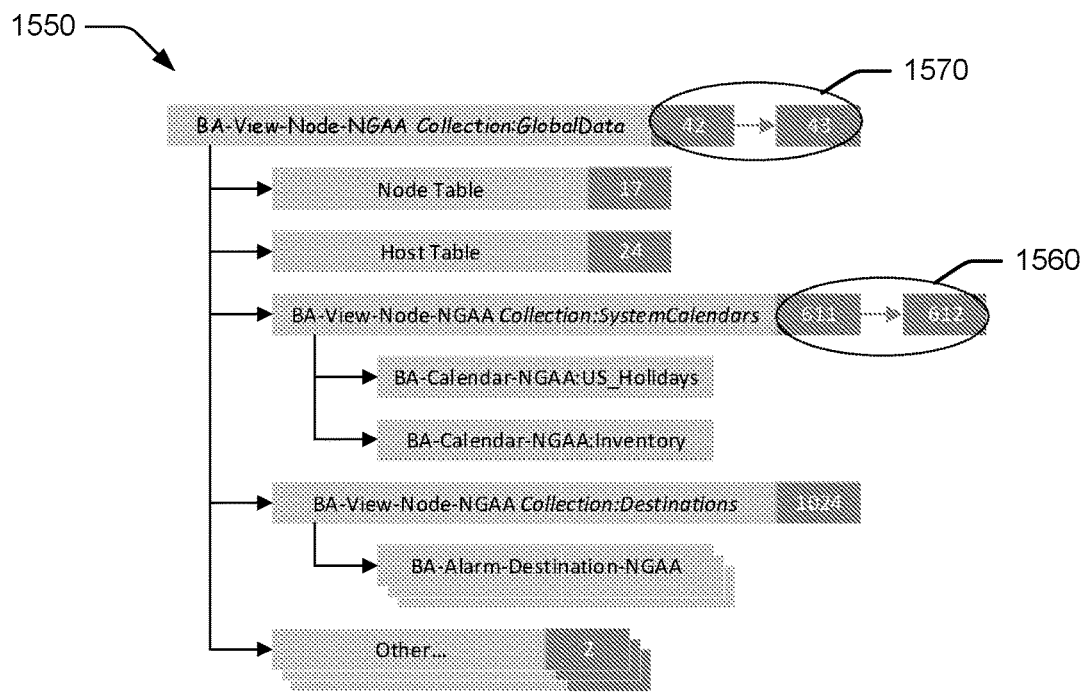

Referring to FIGS. 15A and 15B, there are shown representations of editing global data at the global data server. The global data is writable only at the global data server. In the example shown in FIGS. 15A and 15B, the server's web user interface ("UI") 1500 is used to add a new data 1510 to a subordinate, such as calendar data 1520. For example, the UI 1500 may include a screen for global data 1530 to show or manage data for the US_Holidays calendar 1540. As a result of the new data, for each image or content 1550 of an object, any the subordinate change counts 1560, such as SystemCalendars, are incremented as well as the global change count 1570, such as GlobalData.

Figure 16:
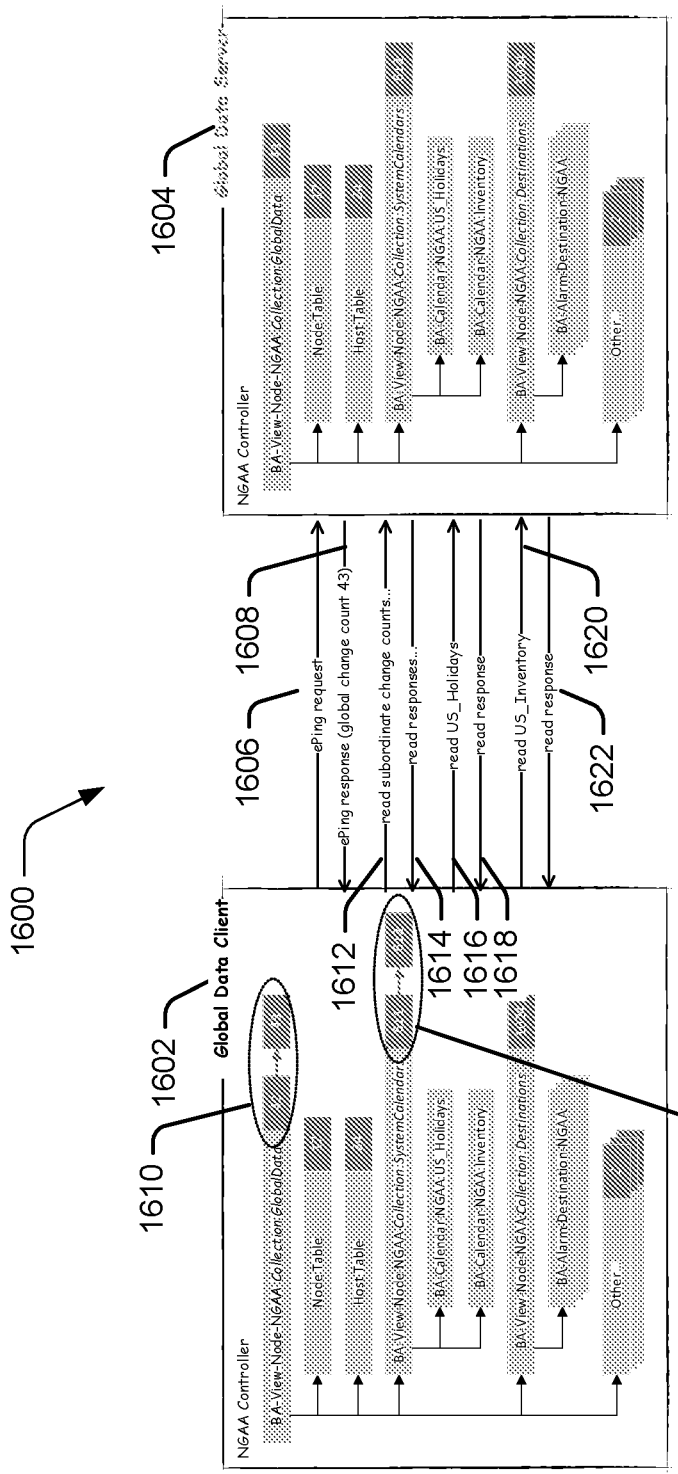
FIG. 16 is a diagrammatic view of the abstract network of FIG. 10 representing an example implementation of synchronizing a global data client with a global data server.

Referring to FIG. 16, there is shown a device signaling diagram depicting synchronization of a global data client 1602 with a global data server 1604. After the global data change, each client 1602 will receive the updated global change count in the next server device ePing response. Specifically, the global data client 1602 sends an ePing request 1606 to the global data server 1604, and the client receives an ePing response 1608 from the server indicating the global change count in response to the request. Since the server's global change count is higher than the client's count 1610, the client 1602 will scan the change count hierarchy of the server 1604 to identify which items to synchronize. The global data client 1602 reads subordinate change counts 1612 from the global data server 1604, and the client receives responses 1614 from the server in response to the read. Likewise, the client 1602 reads data for one or more groups 1616, 1620 (such as US-Holidays and/or Inventory) from the server 1604, and the client receives responses 1618, 1622 associated with the group(s) from the server in response to the read. After the global data is synchronized, the client will update its local change counts 1624.

Figure 17:
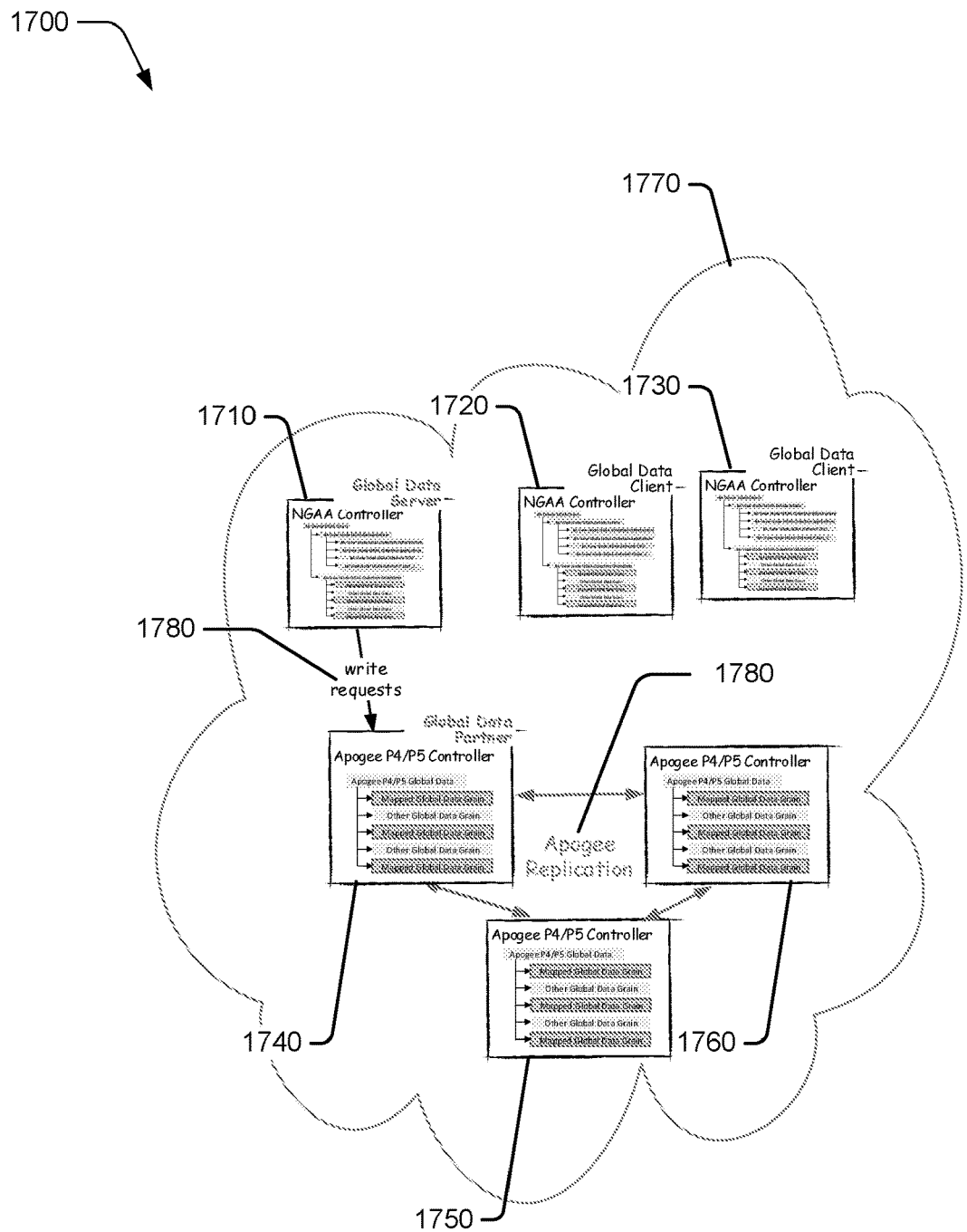
FIG. 17 is a diagrammatic view of the abstract network of FIG. 10 representing an example implementation of synchronization in a mixed controller system.

Referring to FIG. 17, there is shown an example of synchronization in a mixed controller system 1700. For example, the system 1700 may include first controllers 1710, 1720, 1730 of a first type and second controller 1740, 1750, 1760 of a second type. In systems with different types of controllers, different types of devices may exist on the same logical network 1770 but the global data sharing mechanisms will operate independently. The global data server 1710 may be configured with the host name of a single global data partner 1740. Synchronization will be unidirectional 1780, from the global data server 1710 to the global data partner 1740. Only mapped global data will be synchronized. For some embodiments, synchronization may be initiated manually by an operator using a user interface associated with the global data server 1710. For some embodiments, scheduled initiation may initiate synchronization automatically. The global data server 1710 determines which mapped data elements require synchronization. For the second controllers 1740, 1750, 1760, updates 1790 may be distributed or replicated independent of the first controllers 1710, 1720, 1730.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A controller of a building automation system comprising:
   a communication component configured to communicate with at least one other controller of a plurality of automation level devices, the plurality of automation level devices being associated with an automation level network of the building automation system, the plurality of automation level devices including the controller and the at least one other controller; and
   a processor configured to designate a particular controller of the plurality of automation level devices as a global data server, the global data server providing synchronized images of a predefined set of objects across all controllers of the automation level network, the synchronized images include a global data image associated with a device object for each controller, wherein the global data server manages a server global change count of a system-level global data image and one or more global data clients manage a client global change count of each device-level global data image, each client global change count being managed based on a comparison of the server global change count and the client global change count, and wherein global data client of the one or more global data clients scans a change count hierarchy of the global data server to update a global data image of the global data client based on the global change count of the global data server being higher than the global change count of the global data client, and the global data client identifies a synchronization error based on the global change count of the global data server being lower than the global change count of the global data client.

2. The controller as described in claim 1, wherein the global data server synchronizes a predefined set of mapped data grains on a mixed network of controllers having different content and organization of global data.

3. The controller as described in claim 1, wherein the processor includes a web interface module to access information associated with the global data server.

4. The controller as described in claim 1, further comprising input and output components coupled to a plurality of field level devices.

5. The controller as described in claim 1, wherein:
the building automation system includes a management level device and a plurality of field level devices; and
the plurality of automation level devices communicating data and control information between the management level device and the plurality of field level devices.

6. A method of a controller of a building automation system comprising:
communicating, via a communication component of the controller, with at least one other controller of a plurality of automation level devices;
associating, via the communication component, the plurality of automation level devices with an automation level network of the building automation system, the plurality of automation level devices including the controller and the at least one other controller;
designating, via a processor of the controller, a particular controller of the plurality of automation level devices as a global data server, wherein the global data server manages a server global change count of a system-level global data image and one or more global data clients manage a client global change count of each device-level global data image, each client global change count being managed based on a comparison of the server global change count and the client global change count;
providing, via the processor, synchronized images of a predefined set of objects across all controllers of the automation level network, the synchronized images include a global data image associated with a device object for each controller
scanning, by a global data client of the one or more global data clients, a change count hierarchy of the global data server to update a global data image of the global data client in response to determining that the global change count of the global data server is higher than the global change count of the global data client; and
identifying a synchronization error in response to determining that the global change count of the global data server is lower than the global change count of the global data client.

7. The method as described in claim 6, further comprising synchronizing, via the global data server, a predefined set of mapped data grains on a mixed network of controllers having different content and organization of global data.

8. The method as described in claim 6, further comprising accessing information, via a web interface module of the processor, associated with the global data server.

9. The method as described in claim 6, further comprising coupling input and output components to a plurality of field level devices.

10. The method as described in claim 6, further comprising communicating, via the plurality of automation level devices, data and control information between a management level device of the building automation system and a plurality of field level devices of the building automation system.

* * * * *